United States Patent
Higashide et al.

(10) Patent No.: US 11,676,489 B2
(45) Date of Patent: Jun. 13, 2023

(54) OPERATION MANAGEMENT APPARATUS AND OPERATION MANAGEMENT METHOD OF AUTONOMOUS TRAVEL VEHICLE

(71) Applicants: TOYOTA JIDOSHA KABUSHIKI KAISHA, Toyota (JP); DENSO CORPORATION, Kariya (JP)

(72) Inventors: Hiroshi Higashide, Toyota (JP); Kenji Okazaki, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 298 days.

(21) Appl. No.: 17/196,446

(22) Filed: Mar. 9, 2021

(65) Prior Publication Data

US 2021/0312812 A1 Oct. 7, 2021

(30) Foreign Application Priority Data

Apr. 2, 2020 (JP) .............................. JP2020-066774

(51) Int. Cl.
*G08G 1/00* (2006.01)
*G05D 1/02* (2020.01)

(52) U.S. Cl.
CPC ............. *G08G 1/20* (2013.01); *G05D 1/0287* (2013.01); *G08G 1/22* (2013.01)

(58) Field of Classification Search
None
See application file for complete search history.

(56) References Cited

U.S. PATENT DOCUMENTS

2016/0117610 A1 4/2016 Ikeda et al.
2019/0265703 A1 8/2019 Hicok et al.

FOREIGN PATENT DOCUMENTS

JP 2000-264210 A 9/2000

*Primary Examiner* — Alan D Hutchinson
*Assistant Examiner* — Andy Schneider
(74) *Attorney, Agent, or Firm* — Oliff PLC

(57) ABSTRACT

An operation schedule changer can execute, as a schedule change process for changing a normal operation schedule, an advancing change process, a delay change process, and a cut-in change process. The schedule changer executes one of the advancing change process, the delay change process, or the cut-in change process based on a boarding demand.

12 Claims, 18 Drawing Sheets

OPERATION MANAGEMENT APPARATUS AND OPERATION MANAGEMENT METHOD OF AUTONOMOUS TRAVEL VEHICLE

CROSS REFERENCE TO RELATED APPLICATION

This application claims priority to Japanese Patent Application No. 2020-066774 filed on Apr. 2, 2020, which is incorporated herein by reference in its entirety including the specification, claims, drawings, and abstract.

TECHNICAL FIELD

The present disclosure relates to an operation management apparatus and an operation management method for a vehicle, for managing operations of a plurality of vehicles which autonomously travel on a circuit on which a plurality of stops are provided.

BACKGROUND

In recent years, a transportation system has been proposed which uses a vehicle which can autonomously travel. For example, JP 2000-264210 A discloses a vehicle transportation system which uses a vehicle which can autonomously travel along a dedicated path. This vehicle transportation system comprises a plurality of vehicles which travel along the dedicated path, and a supervision and control system which enables operations of the plurality of vehicles. The supervision and control system transmits a departure command and a course command to the vehicle according to an operation plan. The supervision and control system also increases or decreases a number of the vehicles according to a boarding demand.

When a vehicle is to be additionally introduced to the circuit, operation schedules of the operating vehicles which are already traveling on the circuit are changed. The present disclosure provides an operation management apparatus and an operation management method of a vehicle in which an operation schedule can be flexibly changed according to a boarding demand.

SUMMARY

According to one aspect of the present disclosure, there is provided an operation management apparatus of autonomous travel vehicles, which manages operations of a plurality of vehicles which autonomously travel on a circuit. The operation management apparatus comprises an operation schedule provider, an introduction judgment unit, and a schedule changer. The operation schedule provider provides a normal operation schedule, in which an arrival target time and a departure target time to and from each of a plurality of stops provided on the circuit are determined, to each of a plurality of operating vehicles which are autonomously traveling on the circuit. The introduction judgment unit judges whether or not an additional vehicle is to be introduced to the circuit based on a boarding demand on the circuit. The schedule changer changes an operation schedule to be provided to each of the plurality of the operating vehicles from the normal operation schedule when the introduction judgment unit decides introduction of the additional vehicle. The schedule changer can execute, as a schedule change process for changing the normal operation schedule, an advancing change process, a delay change process, and a cut-in change process. In the advancing change process, a predetermined reference vehicle among the plurality of operating vehicles is set as a leading vehicle, and the departure target time of each of the operating vehicles which follow the leading vehicle is advanced from the departure target time determined based on the normal operation schedule so that an inter-vehicle space between a last operating vehicle among the operating vehicles following the reference vehicle and the reference vehicle on a next lap is enlarged for the additional vehicle. In the delay change process, the departure target time of each of the operating vehicles which follow the reference vehicle is delayed from the departure target time determined based on the normal operation schedule so that an inter-vehicle space between the reference vehicle and an operating vehicle following the reference vehicle as a next vehicle is enlarged for the additional vehicle. In the cut-in change process, the plurality of operating vehicles are divided into an advanced vehicle line group for which the departure target time is advanced from the departure target time determined based on the normal operation schedule, and a delayed vehicle line group for which the departure target time is delayed from the departure target time determined based on the normal operation schedule, and an inter-vehicle space between the advanced vehicle line group and the delayed vehicle line group is enlarged for the additional vehicle. The schedule changer executes one of the advancing change process, the delay change process, or the cut-in change process based on the boarding demand.

According to the above-described structure, one of the advancing change process, the delay change process, or the cut-in change process is executed according to a boarding demand on the circuit. By providing a plurality of changing process of the operation schedule, the operation schedule can be flexibly changed according to the boarding demand.

According to another aspect of the present disclosure, in the above-described configuration, the schedule changer may execute one of the advancing change process, the delay change process, or the cut-in change process before introduction of the additional vehicle to the circuit.

According to the above-described structure, the inter-vehicle space for the additional vehicle is secured before the introduction of the additional vehicle.

According to another aspect of the present disclosure, the operation management apparatus may further comprise a boarding demand judgement unit that determines, for each of the operating vehicles and as a boarding demand parameter, a wait time in which an actual loading/unloading time from an actual arrival time to completion of loading/unloading to and from the operating vehicle is subtracted from a stopping target time from the actual arrival time to the departure target time for the operating vehicle at each stop. In such a case, the schedule changer executes one of the advancing change process, the delay change process, or the cut-in change process based on the wait time.

The wait time can be considered as a time from a loading/unloading completion time to the departure target time, and therefore, can be considered as a time in which the advancement of the departure target time is possible. By judging which of the advancing change process, the delay change process, or the cut-in change process is to be executed according to the wait time, a schedule change with a high likelihood of realization can be executed.

According to another aspect of the present disclosure, in the above-described configuration, the schedule changer may determine a total sum of the wait times for one lap of the circuit for each of the operating vehicles. In such a case, the advancing change process is executed when a minimum value of the total sums of the wait times determined for the operating vehicles is less than or equal to a first threshold and greater than a second threshold which is smaller than the first threshold. The cut-in change process is executed when the minimum value of the total sums of the wait times is less than or equal to the second threshold and greater than a third threshold which is smaller than the second threshold. The delay change process is executed when the minimum value of the total sums of the wait times is less than or equal to the third threshold.

In the advancing change process in which the schedule is advanced for the operating vehicles other than the reference vehicle, the magnitude of the advancement is the largest among the three processes of the advancing change process, the delay change process, and the cut-in change process. The cut-in change process has the second largest advancement magnitude. In the delay change process, basically, the advancement is not executed. Based on such a characteristic, the change processes are executed according to the length of the wait time, so that the schedule change with a high realization possibility can be executed.

According to another aspect of the present disclosure, in the above-described configuration, in executing the advancing change process, the schedule changer may determine an advancement magnitude of the departure target time for each of the stops according to the wait time at the stop.

For example, by adjusting the advancement magnitudes according to the wait time at each stop such as setting a larger advancement magnitude of the departure target time for a stop having a relatively long wait time, a schedule change with a high realization possibility can be executed.

According to another aspect of the present disclosure, in the above-described configuration, in executing the delay change process, the schedule changer may determine a push-back magnitude of the departure target time for each of the stops according to the wait time at the stop.

For example, when the wait time has a negative value, the departure of the operating vehicle is delayed from the departure target time. Thus, by adjusting the push-back magnitudes according to the delay time at each stop such as setting a larger push-back magnitude of the departure target time for a stop having a relatively long delay time (negative wait time), a schedule change with a high realization possibility can be executed.

According to another aspect of the present disclosure, there is provided an method of managing the operation of autonomous travel vehicles, for managing operations of a plurality of vehicles which autonomously travel on a circuit. In the operation management method, a normal operation schedule in which an arrival target time and a departure target time to and from each of a plurality of stops provided on the circuit are determined is provided to each of a plurality of operating vehicles which are autonomously traveling on the circuit. It is judged whether or not an additional vehicle is to be introduced to the circuit based on a boarding demand on the circuit. When introduction of the additional vehicle is decided, an operation schedule to be provided to each of the plurality of operating vehicles is changed from the normal operation schedule. As a schedule change process for changing the normal operation schedule, an advancing change process, a delay change process, and a cut-in change process can be executed. In the advancing change process, a predetermined reference vehicle among the plurality of operating vehicles is set as a leading vehicle, and the departure target time of each of the operating vehicles which follow the reference vehicle is advanced from the departure target time determined based on the normal operation schedule so that an inter-vehicle space between a last operating vehicle among the operating vehicles following the reference vehicle and the reference vehicle on a next lap is enlarged for the additional vehicle. In the delay change process, the departure target time of each of the operating vehicles which follow the reference vehicle is delayed from the departure target time determined based on the normal operation schedule so that an inter-vehicle space between the reference vehicle and an operating vehicle following the reference vehicle as a next vehicle is enlarged for the additional vehicle. In the cut-in change process, the plurality of operating vehicles are divided into an advanced vehicle line group for which the departure target time is advanced from the departure target time determined based on the normal operation schedule, and a delayed vehicle line group for which the departure target time is delayed from the departure target time determined based on the normal operation schedule, and an inter-vehicle space between the advanced vehicle line group and the delayed vehicle line group is enlarged for the additional vehicle. One of the advancing change process, the delay change process, or the cut-in change process is executed based on the boarding demand.

According to another aspect of the present disclosure, in the above-described configuration, one of the advancing change process, the delay change process, or the cut-in change process may be executed before introduction of the additional vehicle to the circuit.

According to another aspect of the present disclosure, in the above-described configuration, a wait time may be determined for each of the operating vehicles and as a boarding demand parameter, in which an actual loading/unloading time from an actual arrival time to completion of loading/unloading to and from the operating vehicle is subtracted from a stopping target time from the actual arrival time to the departure target time for the operating vehicle at each of the stops. In this case, one of the advancing change process, the delay change process, or the cut-in change process is executed based on the wait time.

According to another aspect of the present disclosure, in the above-described configuration, a total sum of the wait times for one lap of the circuit may be determined for each of the operating vehicles. In this case, the advancing change process is executed when a minimum value of the total sums of the wait times determined for the operating vehicles is less than or equal to a first threshold and greater than a second threshold which is smaller than the first threshold. The cut-in change process is executed when the minimum value of the total sums of the wait times is less than or equal to the second threshold and greater than a third threshold which is smaller than the second threshold. The delay change process is executed when the minimum value of the total sums of the wait times is less than or equal to the third threshold.

According to another aspect of the present disclosure, in the above-described configuration, in executing the advancing change process, an advancement magnitude of the departure target time may be determined for each of the stops according to the wait time at the stop.

According to another aspect of the present disclosure, in the above-described configuration, in executing the delay change process, a push-back magnitude of the departure target time may be determined for each of the stops according to the wait time at the stop.

According to various aspects of the present disclosure, an operation schedule can be flexibly changed according to the boarding demand.

BRIEF DESCRIPTION OF DRAWINGS

Embodiments of the present disclosure will be described based on the following figures, wherein.

DESCRIPTION OF EMBODIMENTS

Figure 1:
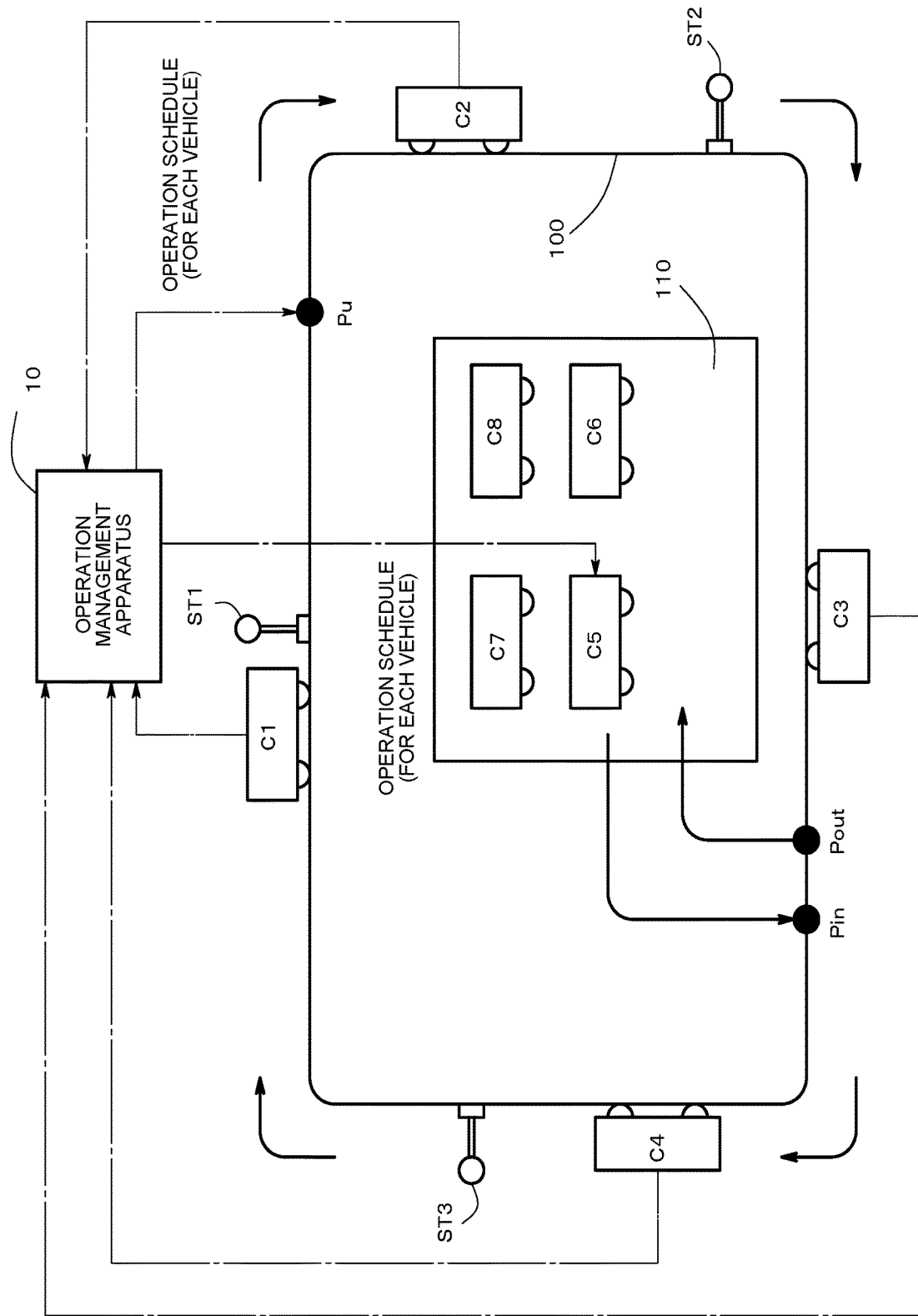
FIG. 1 is a schematic diagram of a transportation system on which an operation management apparatus according to an embodiment of the present disclosure is provided.

FIG. 1 is a schematic diagram which exemplifies a transportation system including an operation management apparatus 10 according to an embodiment of the present disclosure. The transportation system includes, in addition to the operation management apparatus 10, operating vehicles C1~C4, waiting vehicles C5~C8, and stops ST1~ST3.

In the following description, when the plurality of vehicles C1~C8 are not to be distinguished, the index for distinguishing the vehicles may be omitted, and the vehicle may be simply described as "vehicle C". Similarly, when the plurality of stops ST1 ST3 do not need to be distinguished, the stop may be simply described as "stop ST".

In the transportation system exemplified in FIG. 1, the vehicle C travels along a circuit 100 which is predefined, and an unspecified large number of users are transported. The vehicle C circulatory operates in a one-way travel on the circuit 100, as shown by an arrow in the figure.

The circuit 100 may be a dedicated road, for example, on which only the vehicles C are allowed to travel. When the vehicle C is a railroad vehicle, the circuit 100 may be a circulating line. Alternatively, the circuit 100 may be a road segment which is set on a normal road on which vehicles other than the vehicles C can travel.

In addition, a shed 110 is provided on the transportation system, connected to the circuit 100. In FIG. 1, waiting vehicles C5~C8 waiting in the shed 110 are exemplified. Among the waiting vehicles, an additional vehicle to be additionally introduced to the circuit 100 (for example, the waiting vehicle C5) is selected.

As connection points with the shed 110, a retrieval point Pout and an introduction point Pin are provided on the circuit 100. In the example configuration of FIG. 1, the retrieval point Pout and the introduction point Pin are provided between the stops ST2 and ST3.

The operating vehicles C1~C4 traveling on the circuit 100 enter the shed 110 at the retrieval point Pout. The waiting vehicles C5~C8 waiting in the shed 110 are introduced into the circuit 100 from the introduction point Pin. In order to avoid crossover between a vehicle C to be retrieved and a vehicle C to be introduced, the retrieval point Pout is provided upstream of the introduction point Pin.

Further, an operation schedule updating point Pu is provided on the circuit 100, for sending an operation schedule of each vehicle to each of the operating vehicles C1~C4. At the schedule updating point Pu, an operation schedule for one lap starting from the operation schedule updating point Pu, for the vehicle C passing the point, is provided from the operation management apparatus 10 to the vehicle C. In this manner, in the vehicle C, the operation schedule is changed every time the vehicle C passes the schedule updating point Pu (that is, for each lap). Details of a method of providing the operation schedule will be described later.

Structure of Stop

A plurality of stops ST are provided on the circuit 100. FIG. 1 exemplifies three stops ST1~ST3, but the number is not limited to three, and an arbitrary number of stops are provided on the circuit 100 according to an overall length of the circuit 100, buildings along the circuit 100, or the like. The stop ST may, for example, be provided upstanding on a walkway at a side of a roadway on which the operating vehicles C1~C4 travel. The stop ST can communicate with the operation management apparatus 10, for example, via a dedicated communication line or the like. Further, the stop ST can wirelessly communicate with the vehicles C.

Figure 2:
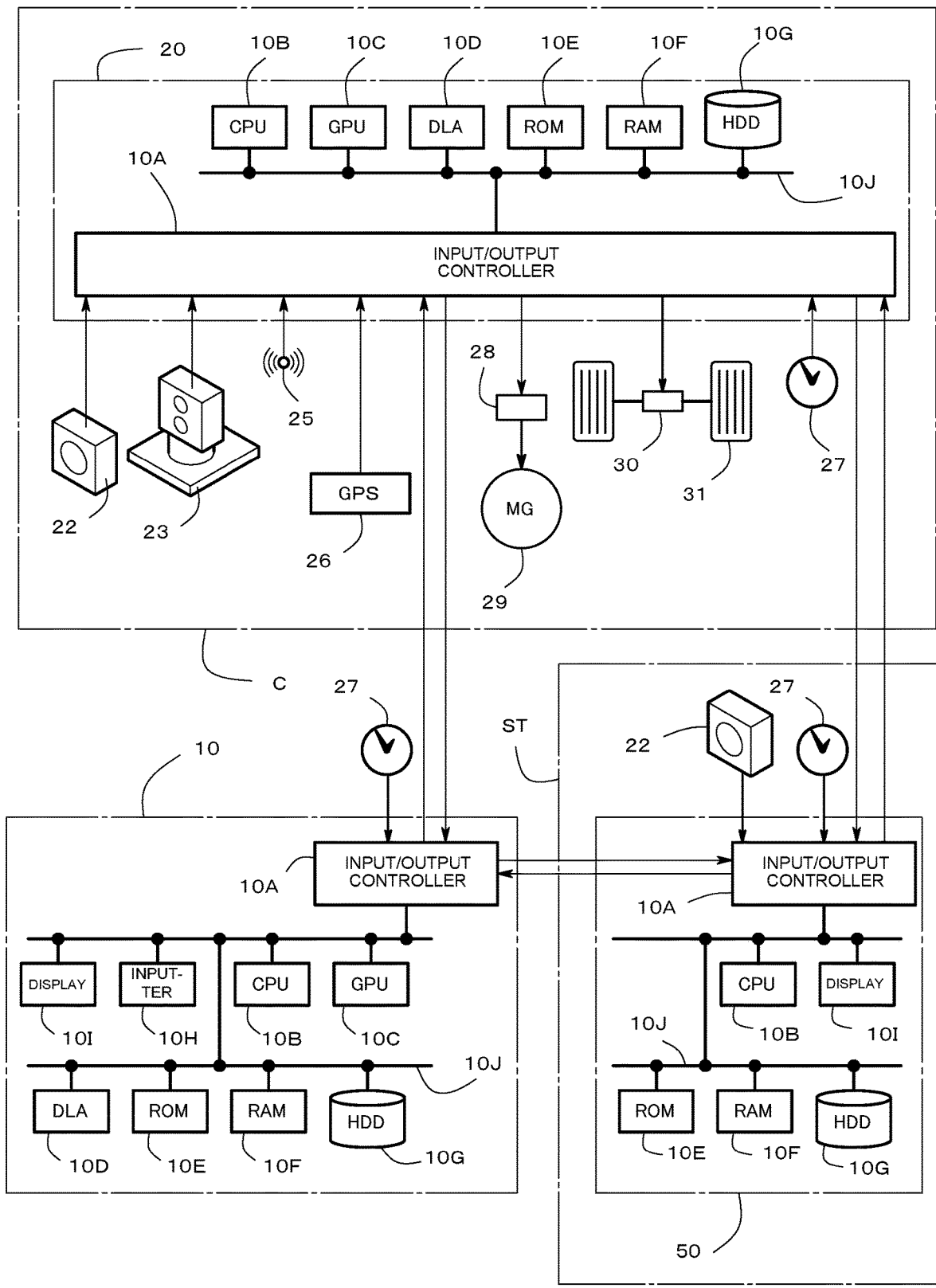
FIG. 2 is a hardware structure diagram of an operation management apparatus, an autonomous travel vehicle, and a stop.

FIG. 2 exemplifies hardware structures of the stop ST, the vehicle C, and the operation management apparatus 10. The stop ST includes a camera 22, a clock 27, and a controller 50. The camera 22 is for imaging passengers awaiting the vehicle C at the stop ST, and can capture, for example, at least one of a still image or a video image of the area around the stop ST.

The controller 50 has, as a hardware structure, an input/output controller 10A, a CPU 10B, a ROM 10E, a RAM 10F, a hard disk drive 10G (HDD), and a display 101, and these constituting components are connected to an internal bus 10J.

Figure 3:
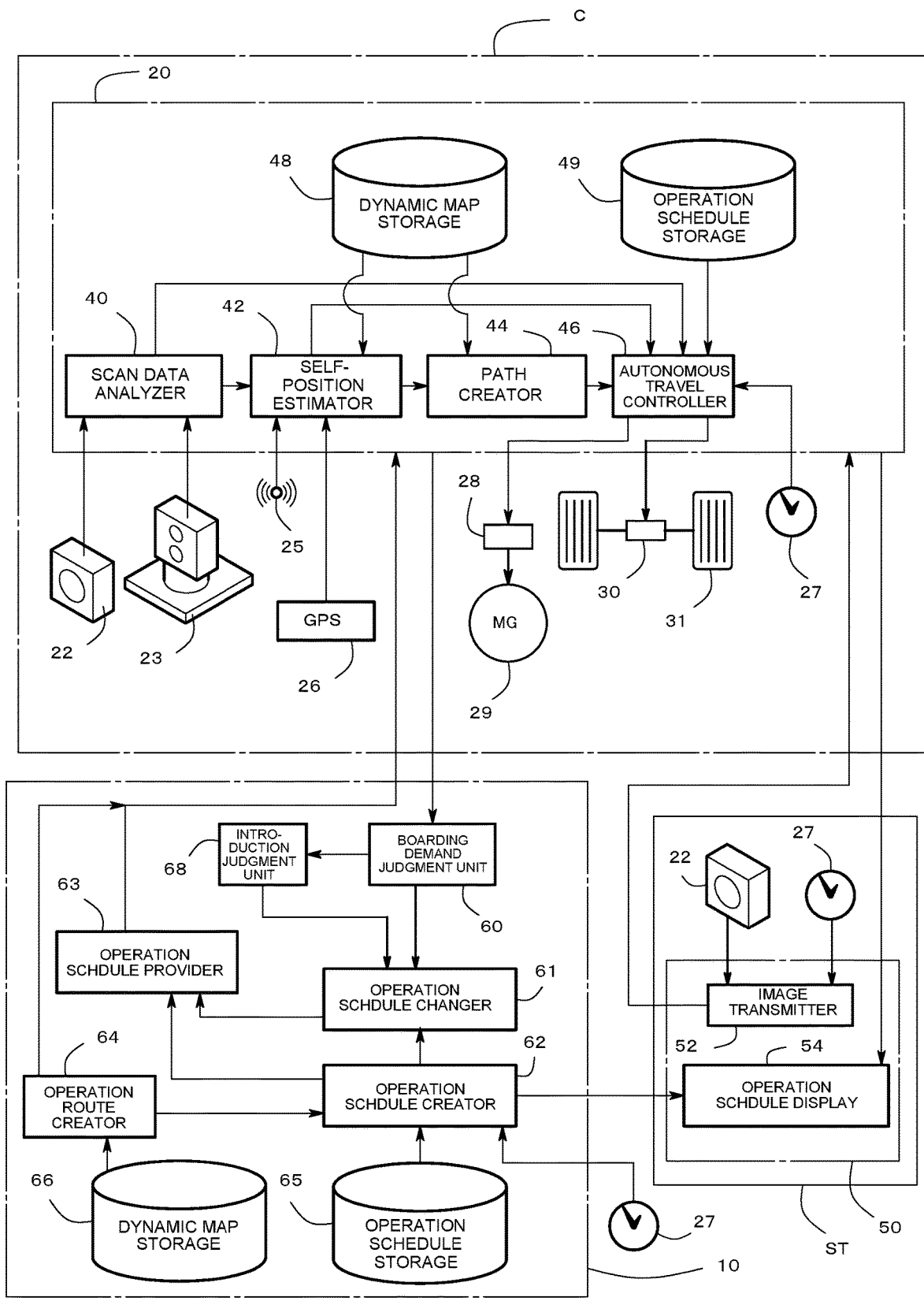
FIG. 3 is a functional block diagram of an operation management apparatus, an autonomous travel vehicle, and a stop.

FIG. 3 exemplifies functional blocks of the stop ST, the vehicle C, and the operation management apparatus 10 in a state of being mixed with the hardware. The controller 50 of the stop ST has, as functional blocks, an image transmitter 52, and an operation schedule display 54.

The image transmitter 52 transmits image data of the periphery of the stop ST captured by the camera 22 to the vehicle C along with time data obtained from the clock 27. The transmitted image data and time data are used for calculating a loading/unloading completion time Tp, to be described later. The operation schedule of the vehicle C is sent from the operation management apparatus 10 to the operation schedule display 54. For example, the operation schedule which is updated every predetermined time period is transmitted from the operation management apparatus 10 to the controller 50. Upon reception of the schedule, the operation schedule display 54 displays a planned arrival time (arrival target time Ta* to be described later) of the vehicle C which will arrive at the stop ST.

Structure of Vehicle

The vehicle C is a vehicle capable of traveling autonomously on the circuit 100, and functions as, for example, a public vehicle which transports an unspecified significant number of users from a predetermined stop ST to another stop ST. The vehicle C may be, for example, an autobus. As exemplified in FIGS. 2 and 3, the vehicle C is an electricity-driven vehicle which has a rotary electric machine 29 (motor) as a drive source, and a battery (not shown) as a power supply. The vehicle C can communicate with, that is, exchange data with, the operation management apparatus 10 and the stop ST via a wireless communication.

The vehicle C is equipped with various mechanisms for enabling the autonomous travel. Specifically, the vehicle C includes a controller 20, a camera 22, a lidar unit 23, a proximity sensor 25, a GPS receiver 26, a clock 27, a drive mechanism 28, and a steering mechanism 30.

The camera 22 images a field of view which is approximately identical to that of the lidar unit 23. The camera 22 has an image sensor such as, for example, a CMOS sensor, a CCD sensor, or the like. An image captured by the camera 22 (captured image) is used for the autonomous travel control, as will be described below.

The lidar unit 23 (LIDAR Unit) is a sensor for autonomous travel, and is, for example, a distance measurement sensor which uses infrared. For example, an infrared laser light ray is scanned from the lidar unit 23 in a horizontal direction and in a vertical direction, so that three-dimensional point group data can be obtained in which distance measurement data for a peripheral environment of the vehicle C are three-dimensionally arranged. The camera 22 and the lidar unit 23 are provided as a collective sensor unit, for example, on four surfaces including a front surface of the vehicle C, a rear surface, and respective side surfaces connecting the front surface and the rear surface.

The proximity sensor 25 is, for example, a sonar sensor, and detects, for example, a distance between a curb which is a boundary between the roadway and the walkway and the vehicle C, when the vehicle C stops at the stop ST. This detection enables stopping with the vehicle C pulled over near the curb, a process commonly known as precise docking. The proximity sensor 25 is provided, for example, on respective side surfaces and on corners of the front surface and the side surfaces of the vehicle C.

The GPS receiver 26 receives a position measurement signal from a GPS satellite. For example, with the reception of the position measurement signal, a current position (latitude and longitude) of the vehicle C is determined.

The controller 20 may be, for example, an electrical control unit (ECU) of the vehicle C, and is formed from a computer. The controller 20 exemplified in FIG. 2 includes an input/output controller 10A which controls input and output of data. In addition, the controller 20 includes, as computing elements, a CPU 10B, a GPU 10C (Graphics Processing Unit), and a DLA 10D (Deep Learning Accelerators). Further, the controller 20 includes, as storage units, a ROM 10E, a RAM 10F, and a hard disk drive 10G (HDD). These constituting components are connected to an internal bus 10J.

FIG. 3 illustrates example functional blocks of the controller 20. The functional blocks include a scan data analyzer 40, a self-position estimator 42, a path creator 44, and an autonomous travel controller 46. Moreover, the controller 20 includes, as storage units, a dynamic map storage 48, and an operation schedule storage 49.

The dynamic map storage 48 stores dynamic map data of the circuit 100 and a periphery thereof. The dynamic map is a three-dimensional map, and stores, for example, a position and a shape (three-dimensional shape) of the road (roadway and walkway). In addition, positions of a traffic lane, a crosswalk, a stop line, or the like drawn on the road are also stored in the dynamic map. In addition, a position and a shape (three-dimensional shape) of a building and constructions such as a signal light for vehicle are also stored in the dynamic map. The dynamic map data is provided from the operation management apparatus 10.

The operation schedule storage 49 stores an operation schedule of the vehicle C equipped with the storage. As described above, the operation schedule is updated once per lap at the operation schedule updating point Pu (refer to FIG. 1).

The vehicle C autonomously travels along the data of the circuit 100 stored in the dynamic map storage 48. In the autonomous travel, the three-dimensional point group data of the peripheral environment of the vehicle C is acquired by the lidar unit 23. In addition, the image of the peripheral environment of the vehicle C is captured by the camera 22.

An object in the captured image captured by the camera 22 is analyzed by the scan data analyzer 40. For example, an object in the captured image is detected by known deep learning methods such as SSD (Single Shot Multibox Detector) and YOLO (You Only Look Once) using supervised learning, and attributes thereof (such as a passerby, a construction, or the like) are recognized.

In addition, the scan data analyzer 40 acquires the three-dimensional point group data (lidar data) from the lidar unit 23. By overlapping the captured image of the camera 22 and the lidar data, it becomes possible to determine what object of what attribute (a passerby, a construction, or the like) is positioned at what distance from the vehicle.

The self-position estimator 42 estimates a self position in the dynamic map based on a self position (latitude and longitude) received from the GPS receiver 26.

The path creator 44 creates a path from the estimated self position to an immediately near target point. For example, a path from the self position to the stop ST is created. When it becomes certain that an obstacle exists on a straight-line path from the self position to the stop ST based on the three-dimensional point group data by the lidar unit 23 and the captured image by the camera 22, a path is created to avoid the obstacle.

The autonomous travel controller 46 executes travel control of the vehicle C based on the overlap data of the captured image and the lidar data, the self position, the path which is already created, and the operation schedule, determined as above. For example, a traveling velocity on the path which is already created is set at a velocity V1 (to be described later) determined by the operation schedule. For example, the autonomous travel controller 46 controls the drive mechanism 28 such as an inverter, to maintain the velocity of the vehicle C at the velocity V1. In addition, the autonomous travel controller 46 applies a control such that the vehicle C proceeds on the determined path, through control of the steering mechanism 30 such as an actuator.

At the stop ST, the autonomous travel controller 46 opens a loading/unloading door (not shown) after stopping the vehicle C. In this process, the autonomous travel controller 46 refers to the clock 27, and transmits an actual arrival time Ta, which is a time when the vehicle C has actually arrived at the stop ST, to the operation management apparatus 10. Moreover, the autonomous travel controller 46 refers to the clock 27, and maintains the vehicle C at a stopped state until a departure target time Td* (to be described later) determined by the operation schedule is reached.

Further, when there still remains an embarking (loading) passenger at the stop ST or when there still remains a passenger disembarking (unloading) from the vehicle C even after the departure target time Td*, the stopped state of the vehicle C is maintained. When it is judged that there are no more embarking or disembarking (loading/unloading) passengers, the autonomous travel controller 46 closes the loading/unloading door (not shown), and applies travel control so that the vehicle C moves away from the stop ST. In this process, the autonomous travel controller 46 refers to the clock 27, and transmits an actual departure time Td, which is a time when the vehicle C has actually departed from the stop, to the operation management apparatus 10.

As an example method of judging whether or not there still remains one or more embarking passengers (a line is still formed) at the stop ST, the camera 22 and the lidar unit 23 which are provided outside of the vehicle C may be used. For example, it is possible to judge whether or not an embarking passenger is present at the stop ST by overlapping the data of the captured image and the lidar data. Alternatively, a captured image by the camera 22 of the stop ST may be received and the image may be analyzed by the scan data analyzer 40, to thereby enable judgment of the presence or absence of an embarking passenger at the stop ST.

The scan data analyzer 40 compares, for example, a loading completion time determined based on the overlap data of the captured image by the camera 22 of the vehicle C and the lidar data obtained by the lidar unit 23, with a loading completion time determined based on the captured image by the camera 22 of the stop ST. For example, the scan data analyzer 40 sets a later values of these two points in time; that is, a time at which the loading has reliably been completed in consideration of these times, as a true loading completion time.

Further, as a method of judging whether or not there is still a disembarking passenger in the vehicle C, for example, an image captured by a camera provided inside the vehicle C (not shown) is used. For example, a captured image of inside the vehicle cabin is analyzed by the scan data analyzer 40, and presence or absence of the disembarking passenger is determined. The scan data analyzer refers to the clock 27, and sets a time when the unloading is completed as an unloading completion time.

In addition, the scan data analyzer 40 transmits, to the operation management apparatus 10, a later one of the true loading completion time and the unloading completion time described above, as a loading/unloading completion time Tp (to be described later).

Structure of Operation Management Apparatus

The operation management apparatus 10 manages the operations of the vehicles C which autonomously travel on the circuit 100. The operation management apparatus 10 is placed, for example, in a management company which manages the operations of the vehicles C. The operation management apparatus 10 is formed from, for example, a computer. FIG. 2 exemplifies a hardware structure of the operation management apparatus 10.

Similar to the hardware structure of the vehicle C, the operation management apparatus 10 comprises an input/output controller 10A, a CPU 10B, a GPU 10C, a DLA 10D, a ROM 10E, a RAM 10F, and a hard disk drive 10G (HDD). These constituting components are connected to an internal bus 10J.

The operation management apparatus 10 further comprises an inputter 10H such as a keyboard and a mouse, for inputting data as necessary. The operation management apparatus 10 further comprises a display 101 such as a display device for graphically displaying the operation schedule or the like. The inputter 10H and the display 101 are connected to the internal bus 10J.

FIG. 3 exemplifies functional blocks of the operation management apparatus 10. The operation management apparatus 10 includes, as storage units, an operation schedule storage 65 and a dynamic map storage 66. In addition, the operation management apparatus 10 includes, as functional units, a boarding demand judgment unit 60, an operation schedule changer 61, an operation schedule creator 62, an operation schedule provider 63, an operation route creator 64, and an introduction judgment unit 68.

The operation route creator 64 creates a route on which the vehicle C is to travel, that is, the circuit 100. For example, a path is selected from a road which includes a branch, to create the circuit 100. Dynamic map data corresponding to the circuit 100 which is created is extracted from the dynamic map storage 66, and is transmitted to the vehicle C.

The operation schedule creator 62 creates a normal operation schedule to be described later. The boarding demand judgment unit 60 determines a boarding demand for each of the operating vehicles C1~C4 based on a wait time Dw to be described later. The introduction judgement unit 61 judges whether or not an additional vehicle is to be introduced to the circuit 100 based on the boarding demand.

The operation schedule changer 61 changes, when the introduction judgment unit 68 decides introduction of the additional vehicle, the operation schedule to be provided to each of the operating vehicles C1~C4 which are already autonomously traveling on the circuit 100, from the normal schedule.

The operation schedule provider 63 provides the normal operation schedule created by the operation schedule creator 62 to each of the operating vehicles C1~C4 at the operation schedule updating point Pu. In addition, when the operation schedule has been changed by the operation schedule changer 61 from the normal operation schedule, the operation schedule provider 63 temporarily stops provision of the normal operation schedule, and provides the changed operation schedule to each of the operating vehicles C1~C4 at the operation schedule updating point Pu.

Normal Operation Schedule

The normal operation schedule is an operation schedule which is applied when the operating vehicles (vehicles C1~C4 in FIG. 1) which autonomously travel on the circuit 100 travel in circle while the number of operating vehicles is maintained. In other words, the normal operation schedule is applied when the vehicles C1~C4 travel one lap of the circuit 100 in a state without an increase or decrease in the number of vehicles.

For example, in the normal operation schedule, an inter-vehicle space of vehicles C traveling in front and in rear is uniformly determined. In addition, a stopping time (planned stopping time to be described later) at each of the stops ST1~ST3 is uniformly set for the vehicles C, and a setting velocity is also uniformly set for the vehicles C. The setting velocity V1 and the planned stopping time at each of the stops ST1~ST3 which are set in the normal operation schedule are also herein referred to as "normal value(s)". The normal operation schedule is determined by the operation schedule creator 62 of the operation management apparatus 10 in advance, for example, before the operation is actually executed with the operation schedule.

As will be described later, in introducing an additional vehicle, the velocity and the planned stopping time which are uniformly set for the vehicles in the normal operation schedule are changed for at least a portion of the operating vehicles. With such a schedule change, the inter-vehicle space is enlarged for the additional vehicle.

Figure 4:
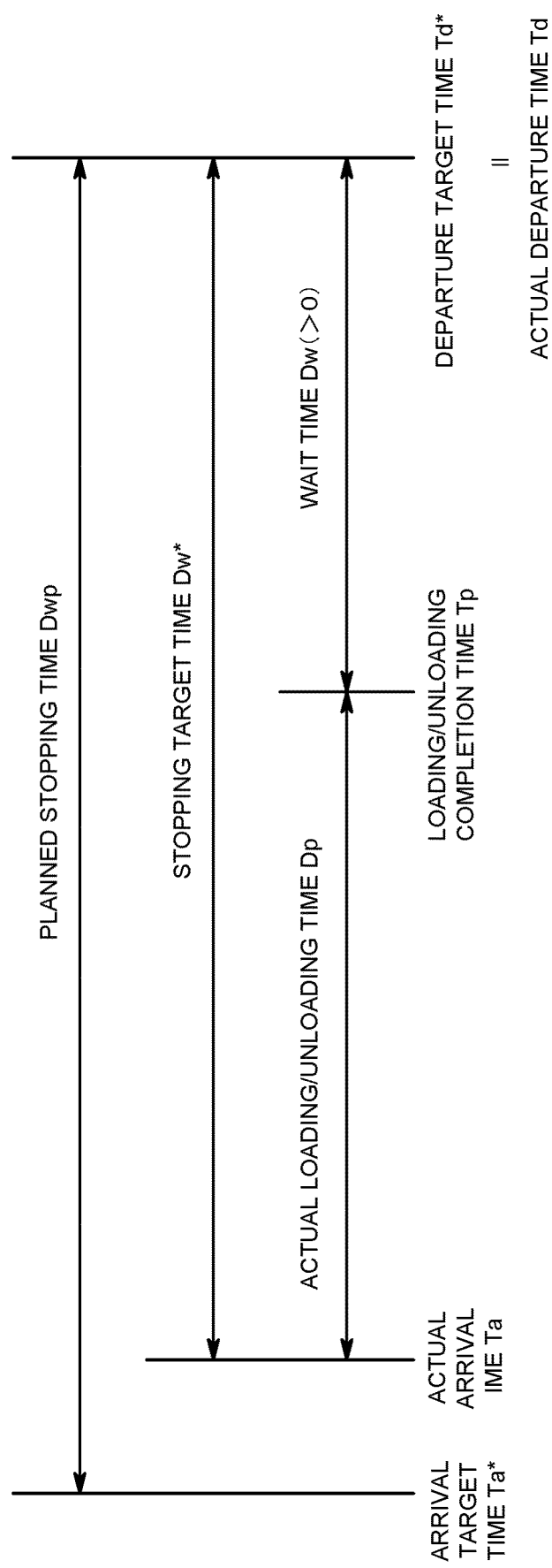
FIG. 4 is an explanatory diagram (1/2) of terms used in an operation schedule creation.
Figure 5:
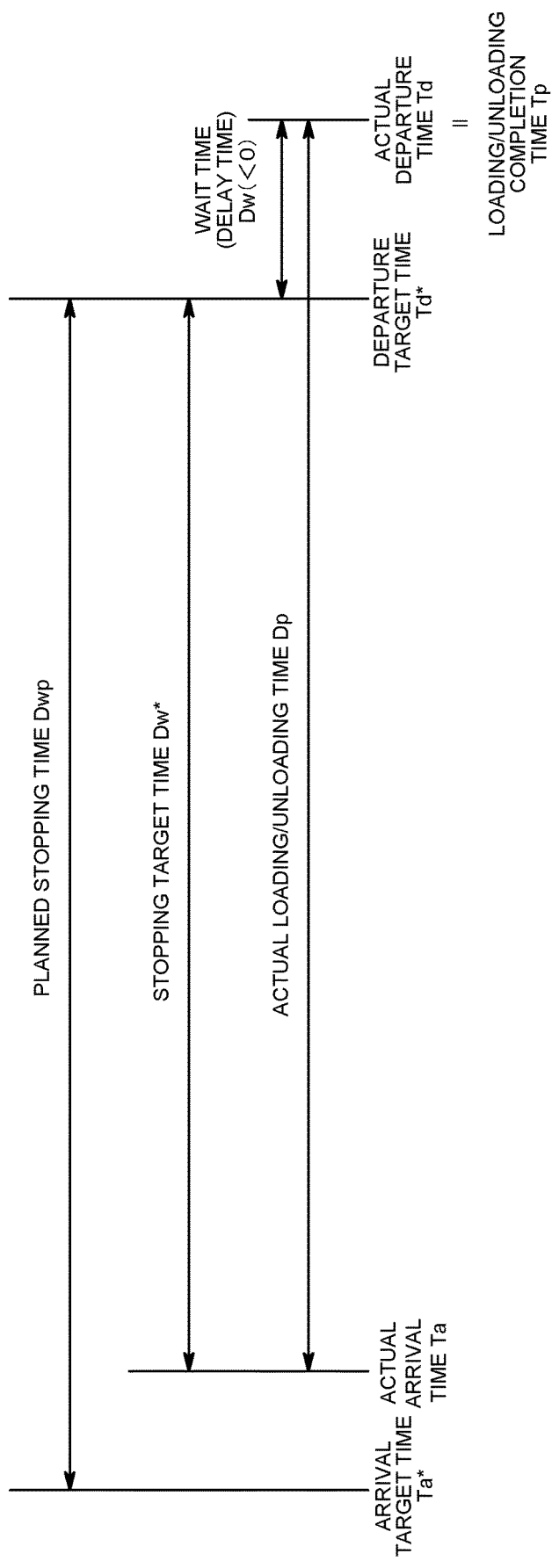
FIG. 5 is an explanatory diagram (2/2) of terms used in an operation schedule creation.

Terms which are used in the operation schedule and in the schedule change are exemplified in FIGS. 4 and 5. As exemplified in FIG. 4, in the normal operation schedule, an arrival target time Ta* at each stop ST and a departure target time Td* at which the vehicle departs from the stop are determined for each vehicle C. A period from the arrival target time Ta* till the departure target time Td* is a stopping time of the vehicle C on the schedule, and is called a planned stopping time Dwp.

In addition, in an actual operation, due to a delay at a previous stop, congestion on the circuit 100, or the like, the vehicle C may arrive at the stop ST at a time other than the arrival target time Ta*. This actual arrival time is called an actual arrival time Ta. In addition, a period from the actual arrival time Ta till the departure target time Td* is a target time for departing the vehicle C from the stop ST according to the schedule, and is called a stopping target time Dw*.

Further, an actual loading/unloading time to and from the vehicle C is called an actual loading/unloading time Dp. The actual loading/unloading time Dp is a period from the actual arrival time Ta until a loading/unloading completion time Tp. In addition, a time obtained by subtracting the actual loading/unloading time Dp from the stopping target time Dw* is called a wait time Dw.

FIG. 4 exemplifies a case in which the wait time Dw has a positive value. In this case, the wait time is a time during which, after the loading/unloading to and from the vehicle C is completed, the vehicle C waits for the departure. After the wait time Dw has elapsed, and the departure target time Td* is reached, the vehicle C departs from the stop. In other words, when the wait time Dw has a positive value, an actual departure time Td which is a time at which the vehicle C actually departs from the stop ST is basically equal to the departure target time Td*.

As will be described later, the wait time Dw becomes, in an advancing change process and in a cut-in change process, a temporal margin for advancing (front-loading) the departure target time Td*, that is, a marginal time.

FIG. 5 exemplifies a case in which the actual loading/unloading time Dp is greater than the stopping target time Dw*, and the wait time Dw has a negative value. In this case, upon completion of the loading/unloading, the vehicle C departs immediately, and thus, the loading/unloading completion time Tp and the actual departure time Td become equal to each other. As will be described later, when such a result is obtained, there is no margin for advancing the departure target time Td*, and, therefore, the operation schedule changer 61 executes a delay change process in place of the advancing change process or the cut-in change process.

Figure 6:
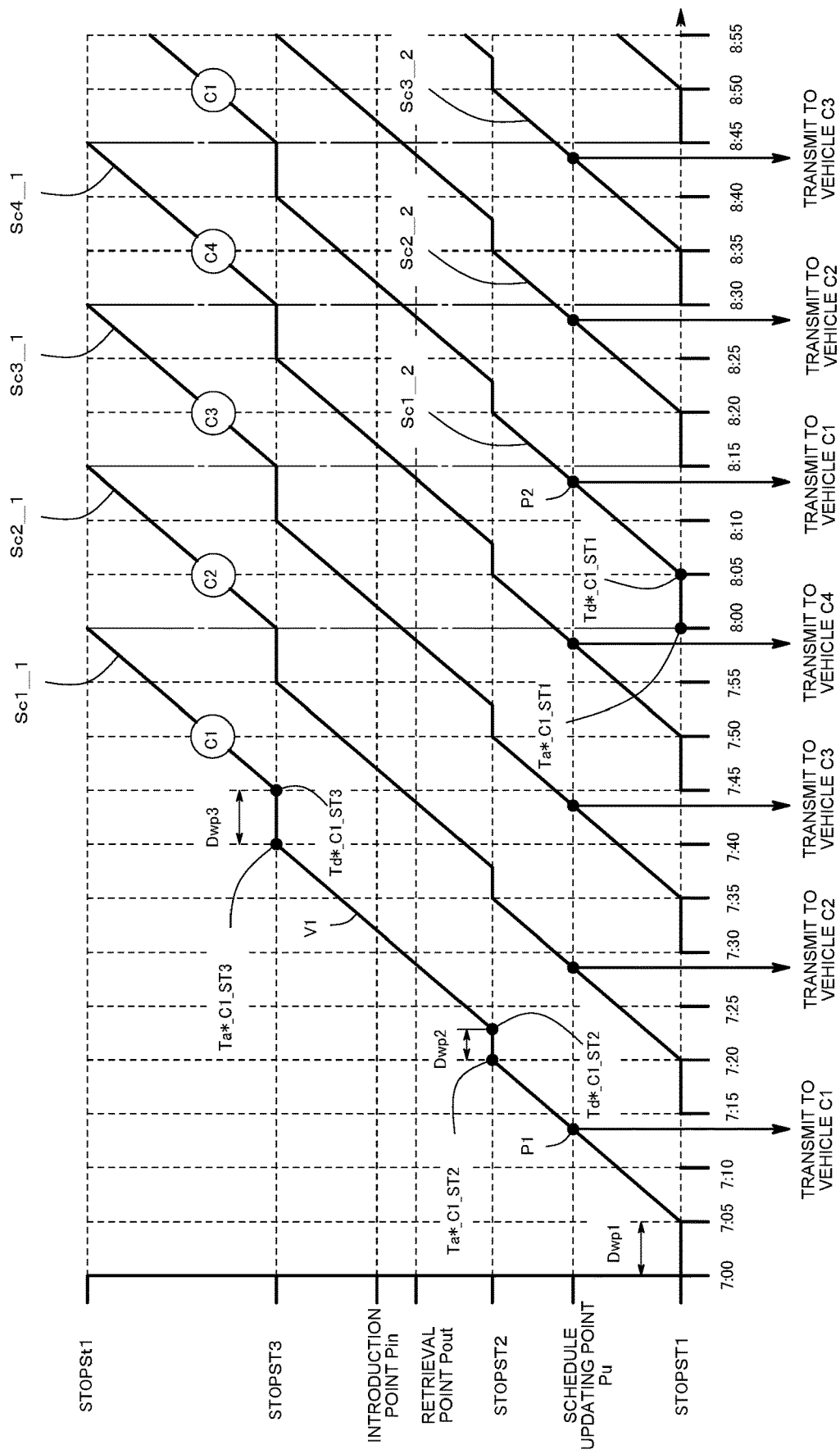
FIG. 6 shows a diagram showing a normal operation schedule of each operating vehicle.

The diagram of FIG. 6 is an example normal operation schedule of each of the vehicles C1~C4. In the diagram, a horizontal axis shows time, and a vertical axis shows various locations on the circuit 100 including the stops ST1~ST3, the operation schedule updating point Pu, the retrieval point Pout, and the introduction point Pin.

In this example configuration, the target velocity is uniformly set at the velocity V1 which is a normal value, for all of the vehicles C1~C4. In addition, the planned stopping times Dwp at the stops ST1, ST2, and ST3 are respectively uniformly set at planned stopping times Dwp1, Dwp2, and Dwp3 which are normal values.

In the example configuration of FIG. 6, a schedule is planned in which the vehicles C are operated with a lap of 60 minutes and a number of vehicles of 4. Thus, an operation interval is 15 minutes. When such a diagram is created by the operation schedule creator 62 (FIG. 3) and an administrator of the operation management apparatus 10, the operation schedule is provided to each of the operating vehicles C1~C4 based on this diagram.

The operation schedule provider 63 (FIG. 3) provides, at the operation schedule updating point Pu, an operation schedule of one lap for the vehicle to each of the operating vehicles C1~C4 passing the updating point. For example, when the operating vehicle C1 passes the operation schedule updating point Pu, the operation schedule data is provided to the operating vehicle C1 from the point Pu, the operation schedule data including data until the operating vehicle C1 next passes the operation schedule updating point Pu, for example, from a point P1 to a point P2 in FIG. 6.

The operation schedule data provided in this process includes arrival target times at the stops ST1~ST3, Ta*_C1_ST1 Ta*_C1_ST3, departure target times from the stops ST1~ST3, Td*_C1_ST1 Td*_C1_ST3, and the target traveling velocity V1.

Advancing Change Process

Figure 7:
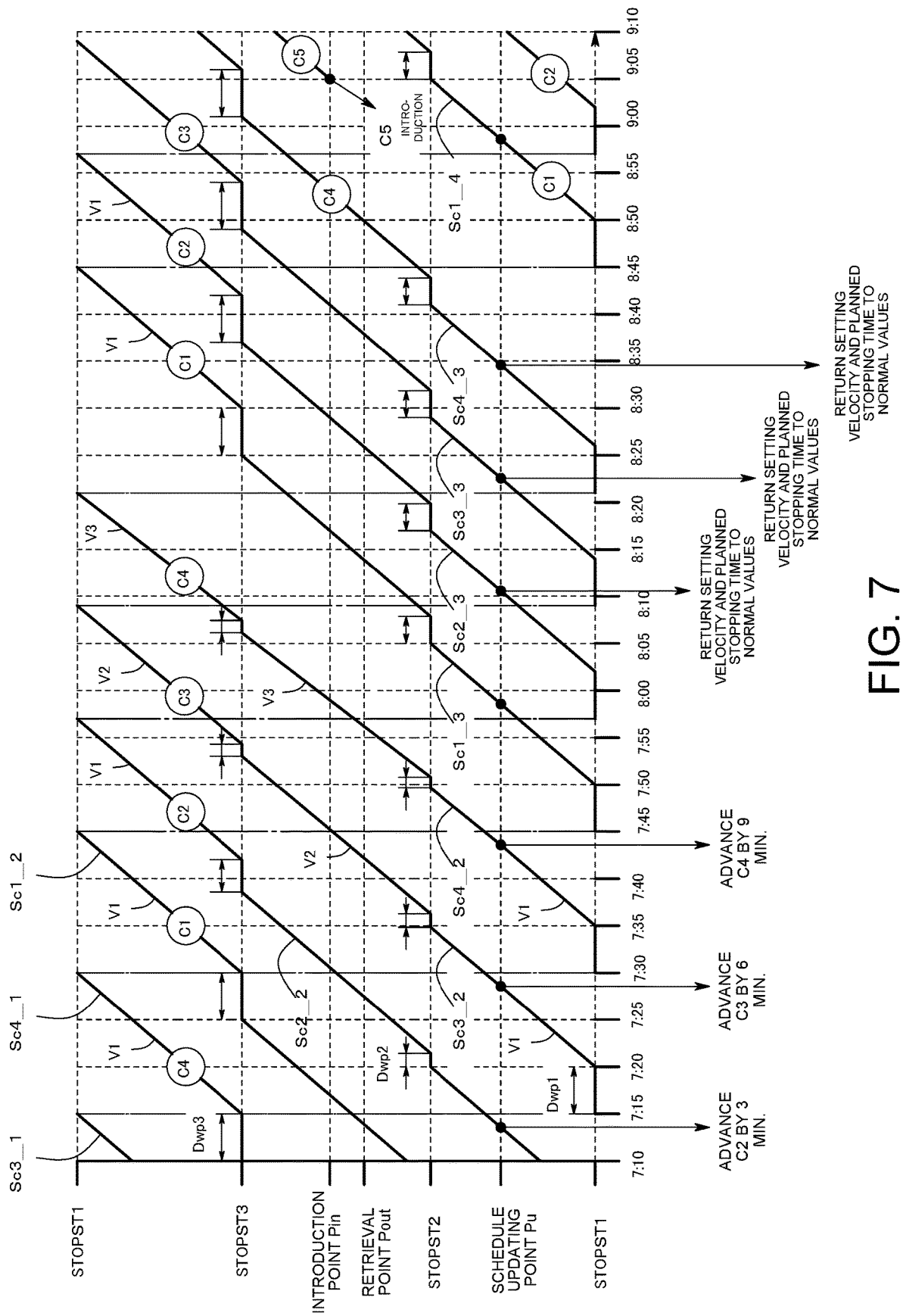
FIG. 7 shows a diagram showing an example of an advancing change process, in which an introduction timing of an additional vehicle is after an operation schedule change.

In changing the normal operation schedule, the operation schedule changer 61 executes one of the advancing change process, the delay change process, or the cut-in change process to be described below. FIG. 7 presents a diagram for explaining an example advancing change process. In this example configuration, an operation diagram of one lap of 60 minutes, the number of vehicles of 4, and the operation interval of 15 minutes is changed to an operation diagram of one lap of 60 minutes, the number of vehicles of 5, and an operation interval of 12 minutes. In other words, the operation interval is shortened by 3 minutes.

When changing from the normal operation diagram, a diagram for a case in which the operating vehicles C1~C4 are operated based on the normal operation schedule is first created for a plurality of laps of the circuit 100. The advancing change process is applied to the created diagram, and the operation schedule is changed.

For example, in the advancing change process, one of the operating vehicles C1~C4 is set as a reference vehicle. In the example configuration of FIG. 7, the operating vehicle C1 is set as the reference vehicle. In the advancing change process, with the reference vehicle C1 being regarded as a leading vehicle, the departure target time Td* of each of the operating vehicles which follow the reference vehicle, vehicles C2~C4, is set earlier than the departure target time Td* determined based on the normal operation schedule. With this process, the inter-vehicle space between the last operating vehicle C4 and the reference vehicle C1 on a next lap is widened, and the additional vehicle C5 (refer to FIG. 1) is introduced in this inter-vehicle space.

For the operating vehicle C1 which is the reference vehicle, for the most part the normal operation schedule is applied before and after the introduction of the additional vehicle C5 to the circuit 100. Alternatively, an advancement or a delay of a slight time may be applied to the schedule. That is, the operation schedule of the reference vehicle C1 may be changed within a range which does not substantially affect securing the inter-vehicle space for the additional vehicle by the advancing change process. For example, a time change of less than or equal to 5% of an advancement magnitude of the last operating vehicle C4 when the reference vehicle C1 is regarded as the leading vehicle may be reflected in the normal operation schedule, and this schedule may be provided to the reference vehicle C1.

As described above, in the example configuration of FIG. 7, the operation interval of the operating vehicles C1~C4 is shortened from 15 minutes to 12 minutes. In other words, for each vehicle, the operation schedule is advanced by 3 minutes. For example, for the operating vehicle C2 following the reference vehicle C1 as a next vehicle, the operation schedule is advanced by 3 minutes from the normal operation schedule.

For the operating vehicle C3 which follows the operating vehicle C2 as a next vehicle, in addition to the 3-minutes advancement by the preceding operating vehicle C2, 3 minutes of advancement for the vehicle C3 is applied, and the operation schedule is thus advanced by a total of 6 minutes. Similarly, for the last operating vehicle C4, an advancement of 3 minutes for the vehicle C4 is added to the total of 6 minutes of advancement for the preceding operating vehicles C2 and C3, and the operation schedule is advanced by a total of 9 minutes.

Figure 8:
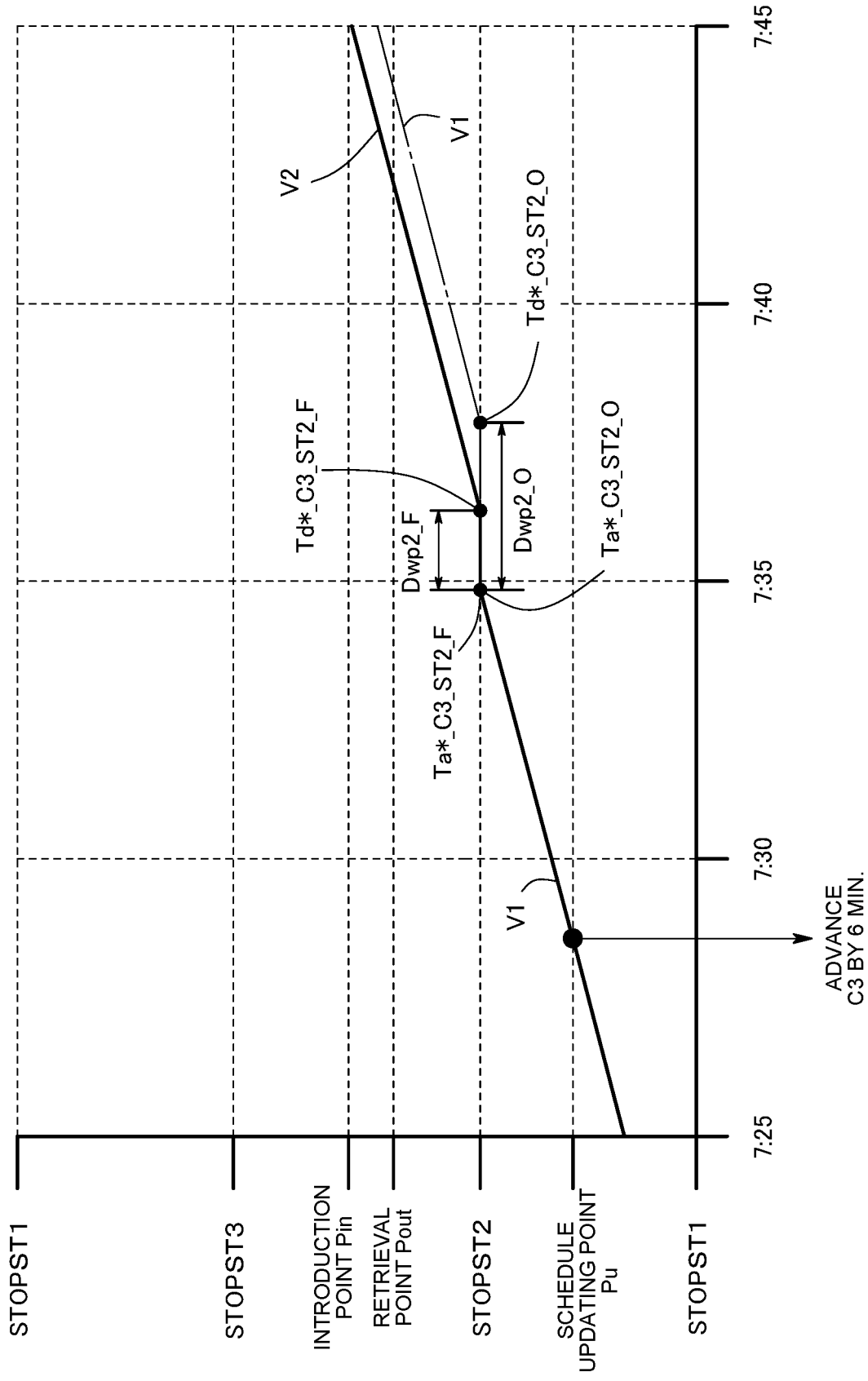
FIG. 8 is a partial enlarged view (around a stop ST2) of FIG. 7, for explaining an advancing change process.

FIG. 8 is a partial enlargement view of FIG. 7, and exemplifies the advancement process of the operating vehicle C3. A solid line shows a changed operation schedule, and a dot-and-chain line shows the normal operation schedule. In this example configuration, the velocity from the operation schedule updating point Pu to the stop ST2 is set at the velocity V1 both before and after the schedule change. Therefore, with regard to the arrival target time Ta* of the operating vehicle C3 to the stop ST2, the arrival target time before the operation schedule change, Ta*_C3_ST2_O and the arrival target time after the change, Ta*_C3_ST2_F, are the same time.

On the other hand, with regard to the departure target time Td*, the departure target time after the schedule change, Td*_C3_ST2_F, is set earlier than the departure target time based on the normal operation schedule, Td*_C3_ST2_O. With this process, a planned stopping time Dwp2_F after the schedule change becomes shorter than the planned stopping time Dwp2_O based on the normal operation schedule.

Figure 9:
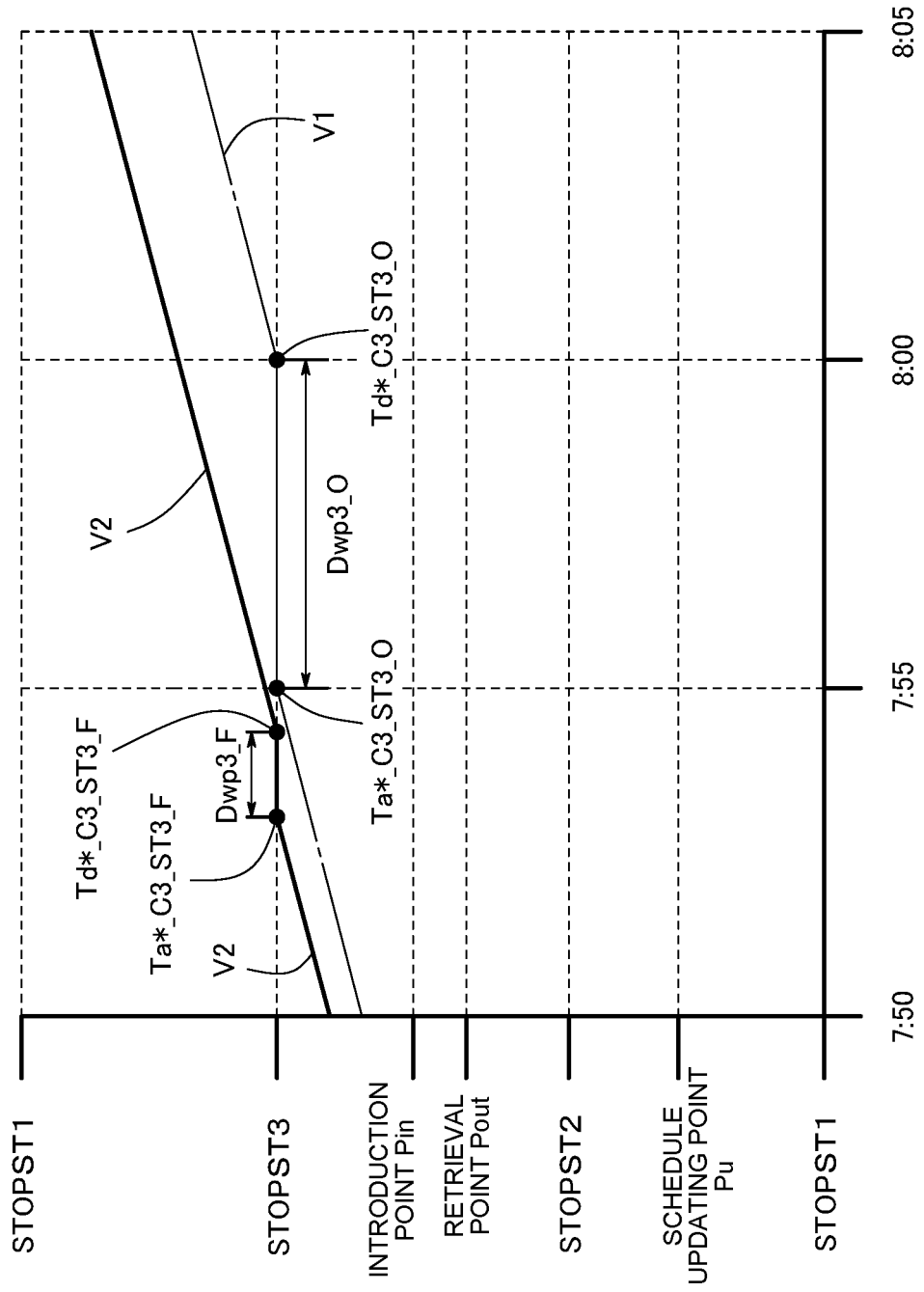
FIG. 9 is a partial enlarged view (around a stop ST3) of FIG. 7, for explaining an advancing change process.

FIG. 9 exemplifies a situation of the schedule change of the operating vehicle C3, before and after the stop ST3. In the example configuration of FIG. 9, the departure target time Td* is advanced at the stop ST2, and the traveling velocity from the stop ST2 to the stop ST3 is changed to V2 which is faster than V1. With these changes, the arrival target time to the stop ST3 after the schedule change, Ta*_C3_ST3_F is advanced from the arrival target time before the operation schedule change, Ta*_C3_ST3_O.

In addition, at the stop ST3, the departure target time Td*_C3_ST3_F is also advanced. As a result, the departure target time Td*_C3_ST3_F is set earlier (advanced) from the departure target time based on the normal operation schedule, Td*_C3_ST3_O.

A magnitude of advancement at each of the stops ST1~ST3 may be evenly applied to the stops ST1~ST3. For example, when the advancement amplitude of 3 minutes is determined for the operating vehicle C2, the planned stopping time Dwp (refer to FIG. 4) at each of the stops ST1~ST3 is shortened by 1 minute.

Figure 10:
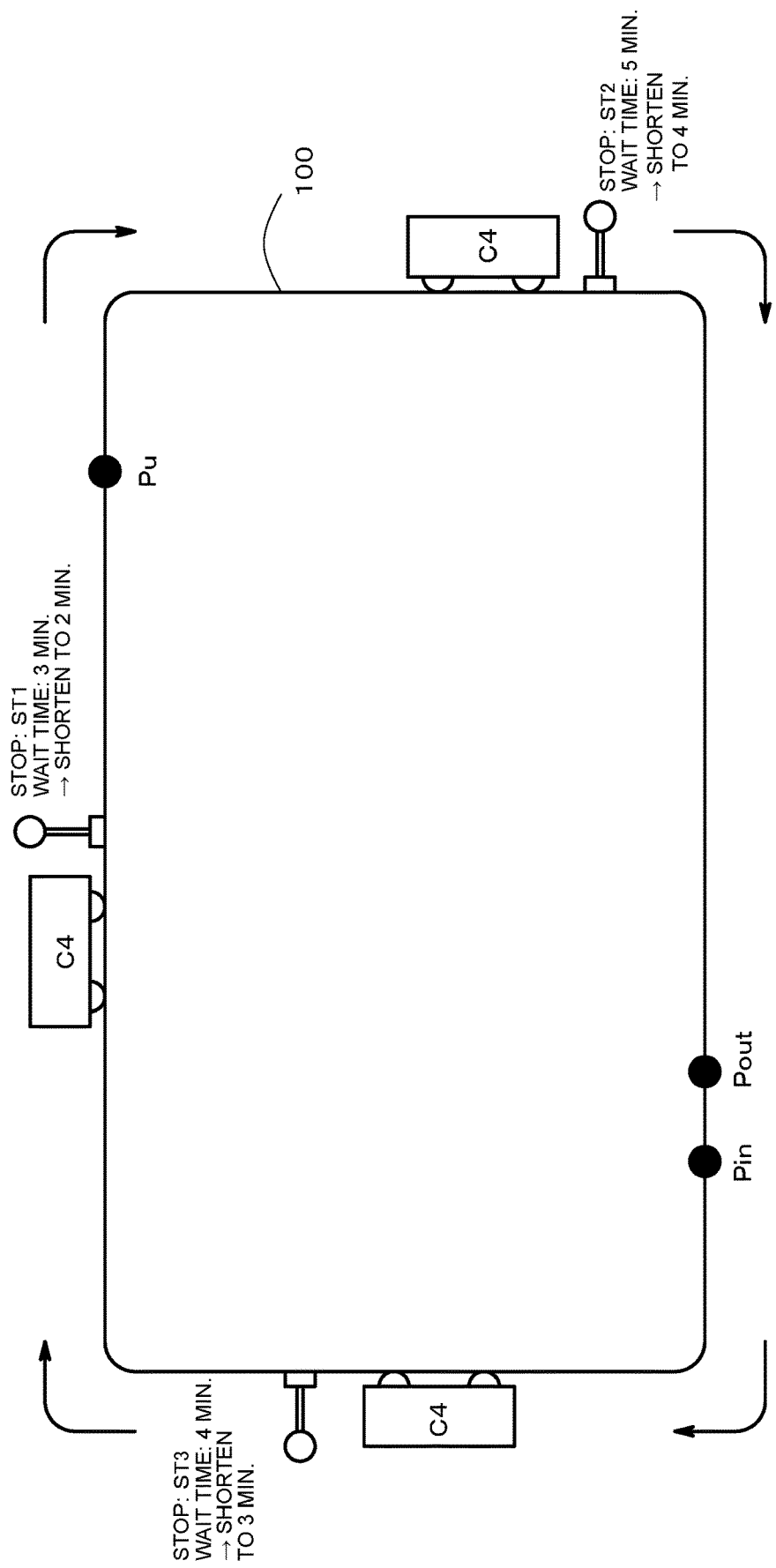
FIG. 10 is a diagram for explaining allocation of an advancement magnitude at each stop.

Alternatively, as exemplified in FIG. 10, the advancement magnitudes at the stops ST1~ST3 may be determined according to a track record value of the wait time Dw in a past lap. For example, FIG. 10 exemplifies a wait time Dw at each of the stops ST1 ST3 at a previous lap of the operating vehicle C4.

As described above, the wait time Dw shows a temporal margin in which the actual loading/unloading time Dp is subtracted from the stopping target time Dw* (refer to FIG. 4), and shows a time for which the advancement is possible. By increasing the advancement magnitude for a larger wait time Dw, an operation schedule which is realistic (which can be realized) can be created.

For example, the advancement magnitude for the operating vehicle C4 is 9 minutes. Of the stops ST1~ST3, the advancement magnitude for the stop ST2 having the longest wait time Dw (5 minutes) is set at 4 minutes. The advancement magnitude for the stop ST3 having the next longest wait time Dw after the stop ST2 (4 minutes) is set at 3 minutes. Similarly, the advancement magnitude for the stop ST1 having the shortest wait time Dw (3 minutes) is set at 2 minutes.

When a total sum of the wait times at the stops ST1~ST3 is less than the advancement magnitude, the setting velocities of the operating vehicles C2~C4 may be increased. For example, in the configuration of FIG. 7, the setting velocity of the vehicle C3 is set at the velocity V2 (>V1) from the stop ST2 to the stop ST3, and from the stop ST3 to the stop ST1. In addition, the setting velocity of the vehicle C4 is set at a velocity V3 (>V2) from the stop ST2 to the stop ST3, and from the stop ST3 to the stop ST1.

With reference to FIG. 7, the operation schedule changed by the operation schedule changer 61 (FIG. 3) from the normal operation schedule is provided to each of the operating vehicles C2~C4 at the operation schedule updating point Pu. After each of the operating vehicles C2~C4 has traveled the circuit 100 for one lap with the changed operation schedule, an operation schedule based on the normal operation schedule is provided to each of the operating vehicles C2~C4 at the operation schedule updating point Pu.

Specifically, an operation schedule is provided to each of the operating vehicles C1~C4, in which the setting velocities of all of the operating vehicles C1~C4 are uniformly set to the velocity V1 which is the normal value, and the planned stopping time Dwp at each stop is also uniformly set to the normal value for all of the operating vehicles C1~C4.

With the change of the operation schedule, as shown by an interval between a schedule Sc4_3 and a schedule Sc1_4 after 8:30, the inter-vehicle space between the operating vehicle C4 and the operating vehicle C1 on the next lap is widened in comparison to the other inter-vehicle spaces. In other words, a diagram is realized in which the operating vehicle C1 traveling with the normal schedule is delayed with respect to the operating vehicle C4 for which the operation schedule is advanced. As shown by 9:05 of FIG.

7, the additional vehicle C5 is introduced from the introduction point Pin of the circuit 100 to the circuit 100, in a manner to enter the enlarged inter-vehicle space.

In this manner, by executing the advancing change process before the additional vehicle C5 is introduced to the circuit 100, the vehicle can be introduced in a state in which the inter-vehicle space for the additional vehicle C5 is secured, and the vehicle can be reliably introduced.

Figure 11:
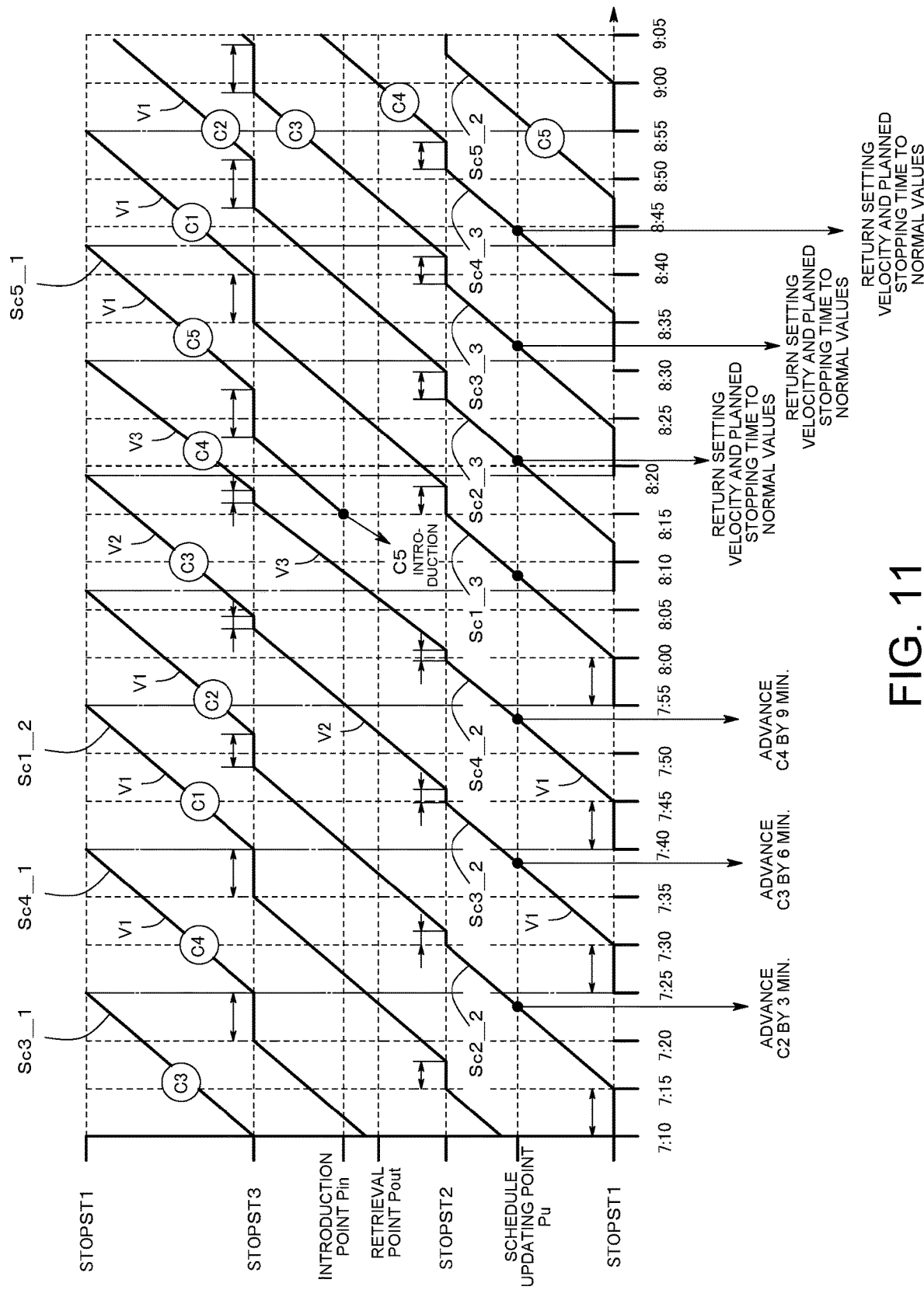
FIG. 11 shows a diagram showing an example of an advancement process, in which an introduction timing of an additional vehicle is set at a timing parallel to an operation schedule change.

When the circuit 100 is a dedicated road on which only the vehicles C travel, there is no external factor such as congestion by normal vehicles, and the additional vehicle C may be reliably introduced. Thus, alternatively, as exemplified in FIG. 11, the introduction timing of the additional vehicle C5 may be set at a timing parallel to the operation schedule change.

Delay Change Process

Figure 12:
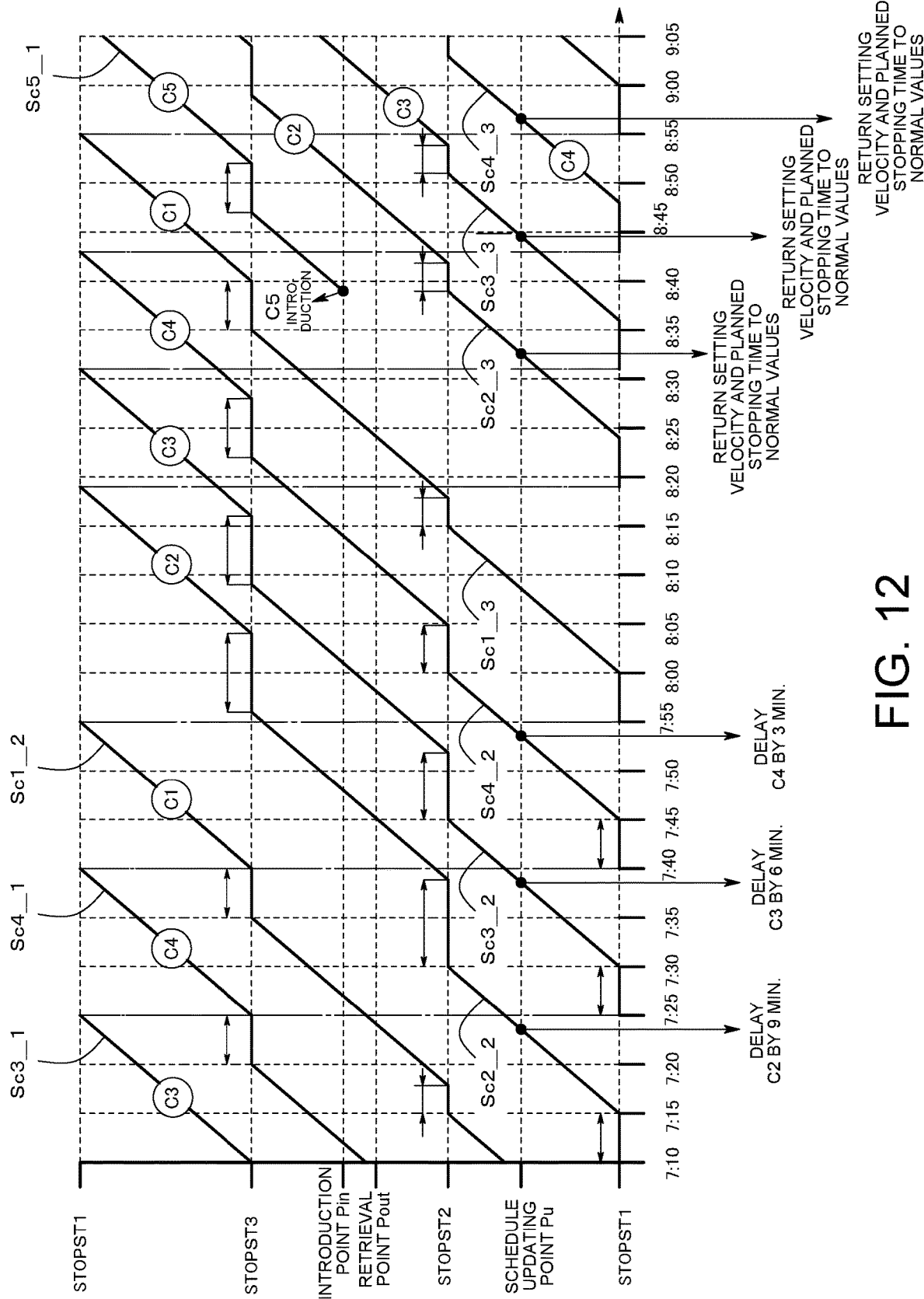
FIG. 12 shows a diagram showing an example of a delay change process, in which an introduction timing of an additional vehicle is after a schedule change.

FIG. 12 exemplifies a diagram for explaining the delay change process. Similar to FIG. 7, in this example configuration also, an operation diagram of one lap of 60 minutes, the number of vehicles of 4, and the operation interval of 15 is changed to an operation diagram of one lap of 60 minutes, the number of vehicles of 5, and the operation interval of 12 minutes.

When changing from the normal operation diagram, a diagram in which the operating vehicles C1~C4 are operated based on the normal operation schedule is first created for a plurality of laps of the circuit 100. The delay change process is applied to the created diagram, and the operation schedule is changed.

For example, in the delay change process, one of the operating vehicles C1~C4 is set as a reference vehicle. In the example configuration of FIG. 12, the operating vehicle C1 is set as the reference vehicle. In the delay change process, with the reference vehicle C1 being regarded as a leading vehicle, the departure target time Td* of each of the operating vehicles C2~C4 which follow the reference vehicle is delayed from the departure target times Td* determined based on the normal operation schedule. With this process, the inter-vehicle space between the reference vehicle C1 and the operating vehicle C2 following the reference vehicle as a next vehicle is enlarged, and the additional vehicle C5 (refer to a time around 8:40) is introduced into this inter-vehicle space.

For the operating vehicle C1 which is the reference vehicle, fundamentally the normal operation schedule is applied before and after the introduction of the additional vehicle C5 to the circuit 100. As described above, alternatively, a short advancement or a short delay in time may be applied to the schedule.

In the example configuration of FIG. 12, the operation interval of the operating vehicles C1~C4 is shortened from 15 minutes to 12 minutes. That is, the operation schedule is delayed by 3 minutes per vehicle. For example, for the operating vehicle C2 which follows the reference vehicle C1 as a next vehicle, the operation schedule is delayed in a schedule Sc2_2 by 9 minutes, which is an accumulated time of 3 minutes for each of the operating vehicles C2~C4. This delay is executed by pushing back the departure target times Td* at the stops ST1~ST3 from the departure target times Td* determined based on the normal operation schedule.

For the operating vehicle C3 following the operating vehicle C2 as a next vehicle, the operation schedule is pushed back by a total of 6 minutes, determined by adding the delay of the operating vehicle C4 following the operating vehicle C3 to the delay for the operating vehicle C3. Similarly, for the operating vehicle C4 which is the last vehicle, the operation schedule is pushed back by 3 minutes, corresponding to the delay of the operating vehicle C4.

The push-back magnitude for each of the operating vehicles C2~C4 may be evenly applied to the departure target times at the stops ST1~ST3. Alternatively, as exemplified in FIG. 13, the push-back magnitudes at the stops ST1~ST3 may be determined according to a track record value of the delay time Dw at a past lap. For example, FIG. 13 exemplifies the wait times Dw at the stops ST1~ST3 for the operating vehicle C4 at a previous lap.

Figure 13:
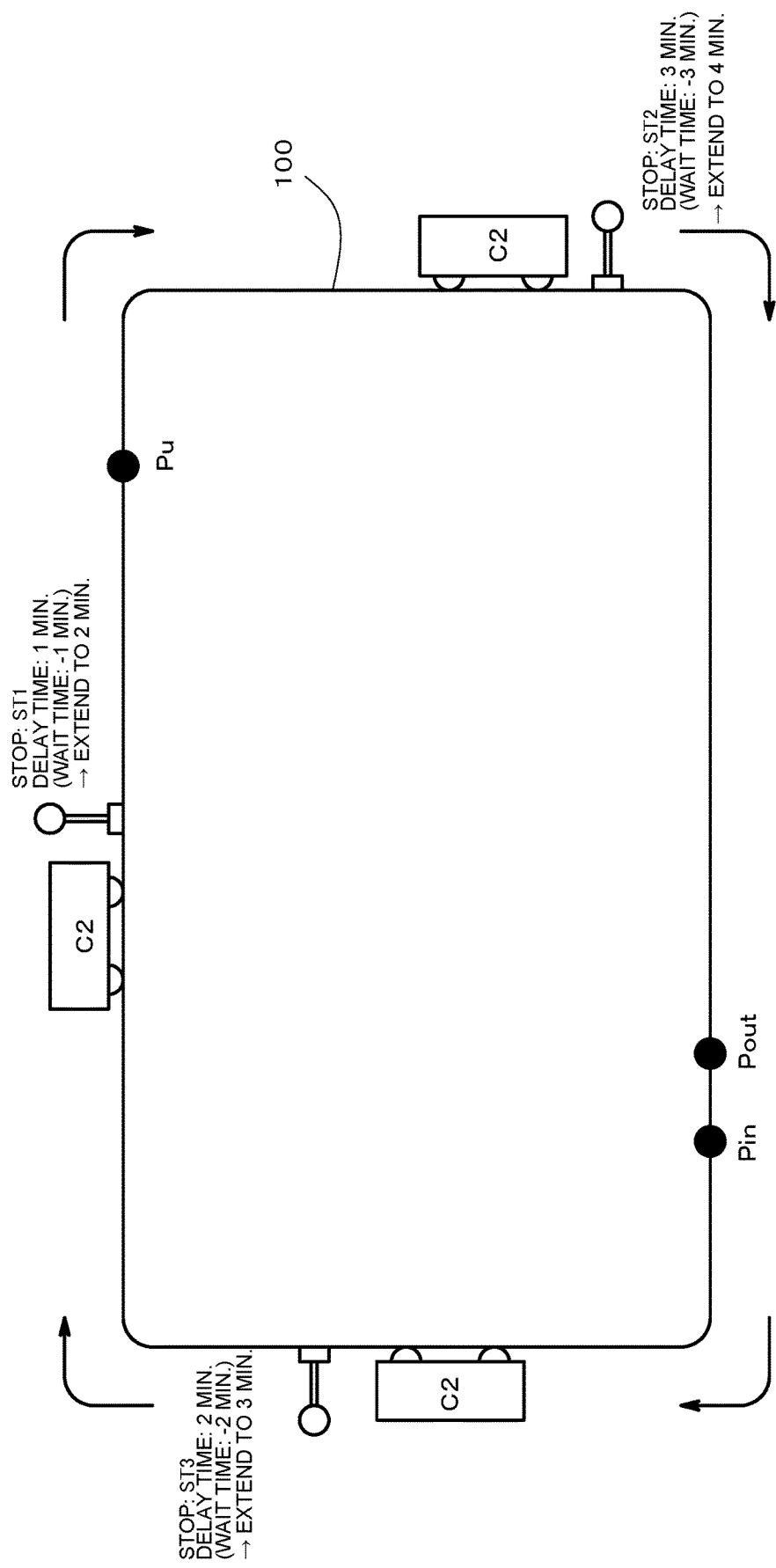
FIG. 13 is a diagram for explaining allocation of a push-back magnitude at each stop.

FIG. 13 shows an example case in which the wait time Dw has a negative value, and the actual departure time Td is later than the departure target time Td*. Thus, in this case, the wait time Dw (<0) is the delay time. By increasing the push-back magnitude for a larger delay time Dw, an operation schedule can be created which matches the delay circumstance (which can be realized).

For example, the push-back magnitude for the operating vehicle C2 is 9 minutes. The push-back magnitude at the stop ST2, of the stops ST1~ST3, having the longest delay time Dw (3 minutes) is set to 4 minutes. The push-back magnitude at the stop ST3 having the next longest delay time Dw (2 minutes) after the stop ST2 is set to 3 minutes. Similarly, the push-back magnitude at the stop ST1 having the shortest delay time Dw (1 minute) is set to 2 minutes.

In the advancing change process, in addition to the adjustment of the planned stopping times Dwp at the stops ST1~ST3, the setting velocity is increased to advance the departure target time Td*. On the other hand, in the delay change process, a configuration may be employed in which the setting velocity is not adjusted, and is uniformly set as V1, and only the planned stopping time Dwp is adjusted, to push back the departure target time Td*.

With reference to FIG. 12, the operation schedule changed by the operation schedule changer 61 (FIG. 3) from the normal operation schedule is provided to each of the operating vehicles C2~C4 at the operation schedule updating point Pu. After each of the operating vehicles C2~C4 has traveled one lap of the circuit 100 under the changed operation schedule, the operation schedule based on the normal operation schedule is provided to each of the operating vehicles C2~C4 at the operation schedule updating point Pu.

As exemplified in the diagram after 7:55, with the change of the operation schedule, as shown by the interval between the schedules Sc1_3 and Sc2_3, the inter-vehicle space between the operating vehicle C1 and the operating vehicle C2 following the operating vehicle C1 as a next vehicle is widened in comparison to the other inter-vehicle spaces. As shown by a time before 8:40 of FIG. 12, the additional vehicle C5 is introduced to the circuit 100 from the introduction point Pin of the circuit 100 in this space.

In this manner, by the delay change process being executed before the additional vehicle C5 is introduced to the circuit 100, the vehicle can be introduced in a state in which the inter-vehicle space for the additional vehicle C5 is secured, and reliable vehicle introduction can be realized.

Figure 14:
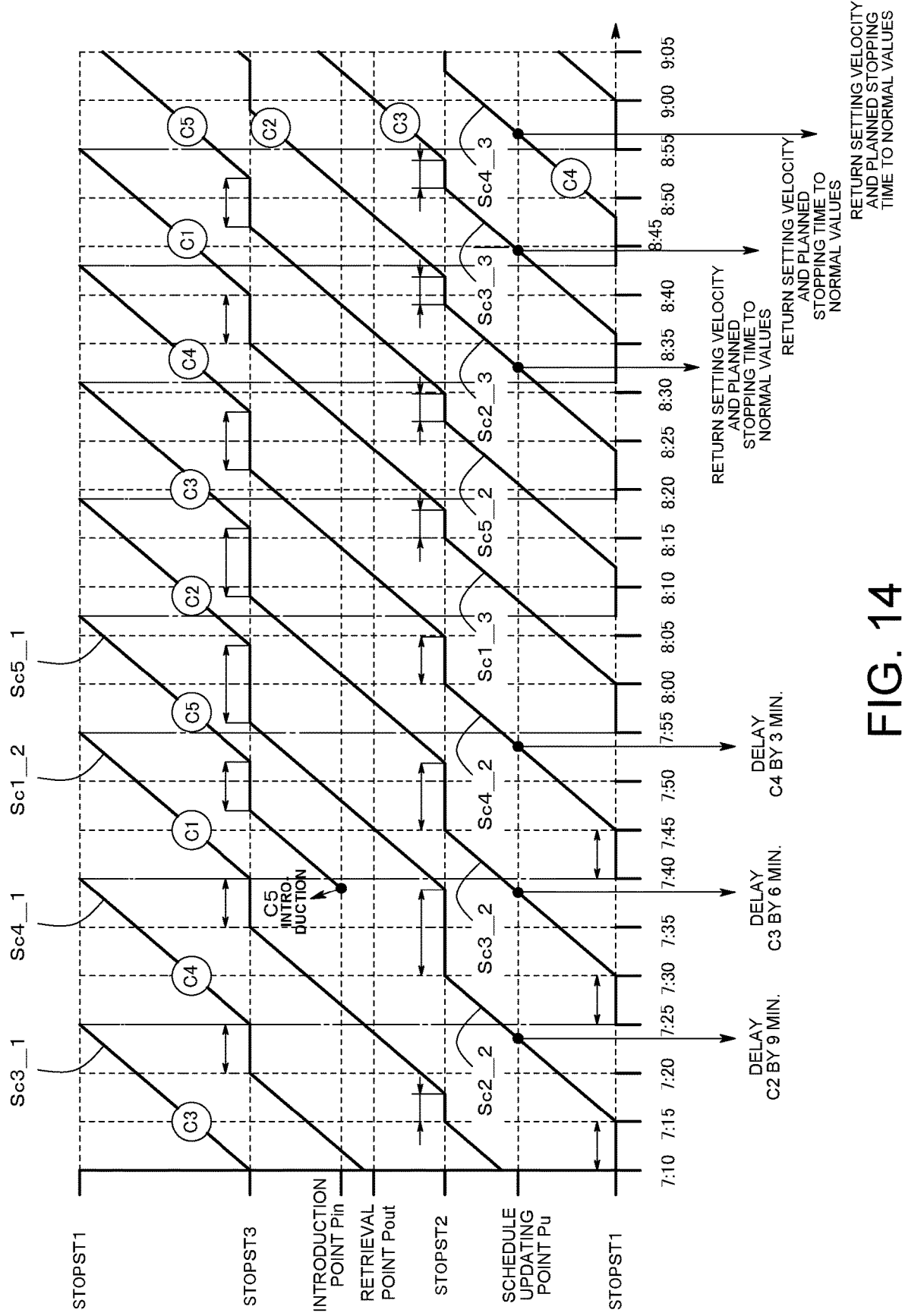
FIG. 14 shows a diagram showing an example of a delay change process, in which an introduction timing of an additional vehicle is set at a timing parallel to an operation schedule change.

When the circuit 100 is a dedicated road on which only the vehicles C travel, there is no external factor such as congestion by ordinary vehicles, and the additional vehicle C can be reliably introduced. Thus, alternatively, as exemplified in FIG. 14, the introduction timing of the additional vehicle C5 may be set at a timing parallel to the operation schedule change.

Cut-in Change Process

Figure 15:
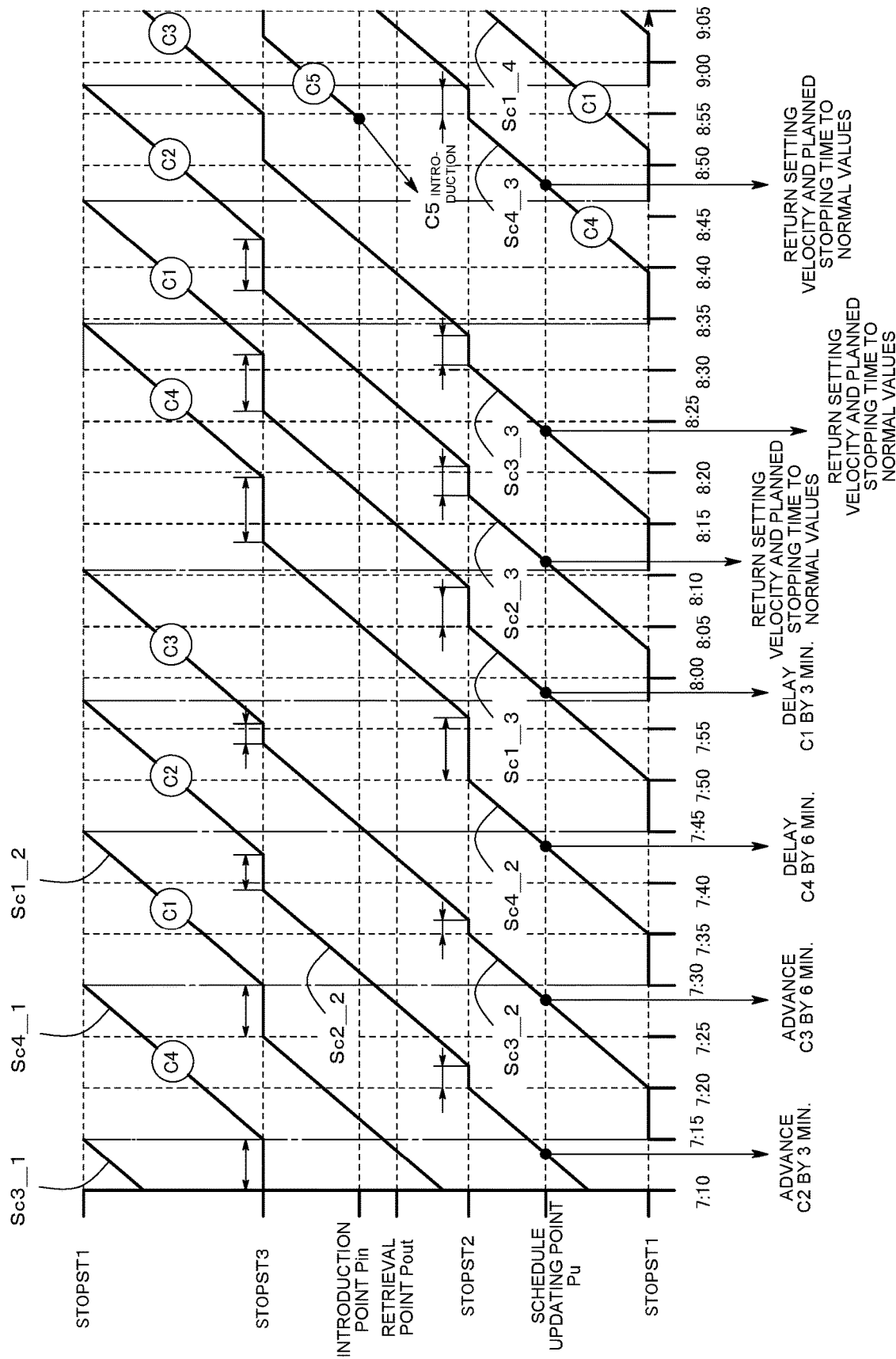
FIG. 15 shows a diagram showing an example of a cut-in change process, in which an introduction timing of an additional vehicle is after an operation schedule change.

FIG. 15 exemplifies a diagram for explaining the cut-in change process. Similar to FIG. 7, in this example configuration also, an operation diagram of one lap of 60 minutes, the number of vehicles of 4, and the operation interval of 15 minutes is changed to an operation diagram of one lap of 60 minutes, the number of vehicles of 5, and the operation interval of 12 minutes.

In changing from the normal operation diagram, the diagram for the case in which the operating vehicles C1~C4 are operated based on the normal operation schedule is first created for a plurality of laps of the circuit 100. The cut-in change process is applied to the created diagram, and the operation schedule is changed.

For example, in the cut-in change process, unlike the advancing change process or the delay change process described above, the reference vehicle is not set. Instead, the operating vehicles C1~C4 are divided into a vehicle line group to which the above-described advancing change process is applied (advanced vehicle line group), and a vehicle line group to which the delay change process is applied (delayed vehicle line group).

The vehicle line refers to a group of operating vehicles traveling consecutively in to the front and rear of each other and, for example, the operating vehicles C2 and C3 are selected as the advanced vehicle line group, and the operating vehicles C4 and C1 are selected as the delayed vehicle line group. With this process, the inter-vehicle space between the advanced vehicle line group and the delayed vehicle line group, more accurately, the inter-vehicle space between the last operating vehicle C3 of the advanced vehicle line group and the leading operating vehicle C4 of the delayed vehicle line group, is enlarged, and the additional vehicle C5 is introduced to this inter-vehicle space (refer to time near 8:55).

In the example configuration of FIG. 15, the operation interval of the operating vehicles C1~C4 is shortened from 15 minutes to 12 minutes. That is, the operation schedule is delayed for 3 minutes for each vehicle. For example, for the leading operating vehicle C2 of the advanced vehicle line, the operation schedule is advanced by 3 minutes from the normal operation schedule. This advancement is executed by advancing the departure target time Td* at each of the stops ST1~ST3 from the departure target time Td* determined based on the normal operation schedule.

In the advanced vehicle line group, for the operating vehicle C3 following the operating vehicle C2 as a next vehicle, the operation schedule is advanced by a total of 6 minutes, determined by adding the advancement of 3 minutes for the leading operating vehicle C2 to the advancement of 3 minutes for the operating vehicle C3.

On the other hand, for the leading operating vehicle C4 of the delayed vehicle line group, the operation schedule is pushed back by a total of 6 minutes, determined by adding the delay of the operating vehicle C1 following the operating vehicle C4 to the delay of the operating vehicle C4. Further, for the last operating vehicle C1, the operation schedule is pushed back by 3 minutes, corresponding to the push back of the operating vehicle C1. This delay is executed by pushing back the departure target time Td* at each of the stops ST1~ST3 from the departure target time Td* determined based on the normal operation schedule.

With reference to FIG. 15, the operation schedule changed by the operation schedule changer 61 (FIG. 3) from the normal operation schedule is provided to each of the operating vehicles C1~C4 at the operation schedule updating point Pu. After each of the operating vehicles C1~C4 has traveled the circuit 100 for one lap with the changed operation schedule, the operation schedule based on the normal operation schedule is provided to each of the operating vehicles C1~C4 at the operation schedule updating point Pu.

With the change of the operation schedule, as shown by the interval between the schedules Sc3_3 and Sc4_3 after 8:10, the inter-vehicle space between the last operating vehicle C3 of the advanced vehicle line group and the leading operating vehicle C4 of the delayed vehicle line group is widened in comparison to the other inter-vehicle spaces. As shown by a time before 8:55 of FIG. 15, the additional vehicle C5 is introduced to the circuit 100 from the introduction point Pin of the circuit 100 in this space.

In this manner, with the execution of the cut-in change process before the additional vehicle C5 is introduced to the circuit 100, the vehicle can be introduced in a state in which the inter-vehicle space for the additional vehicle C5 is secured, and the vehicle introduction can be reliably realized.

Figure 16:
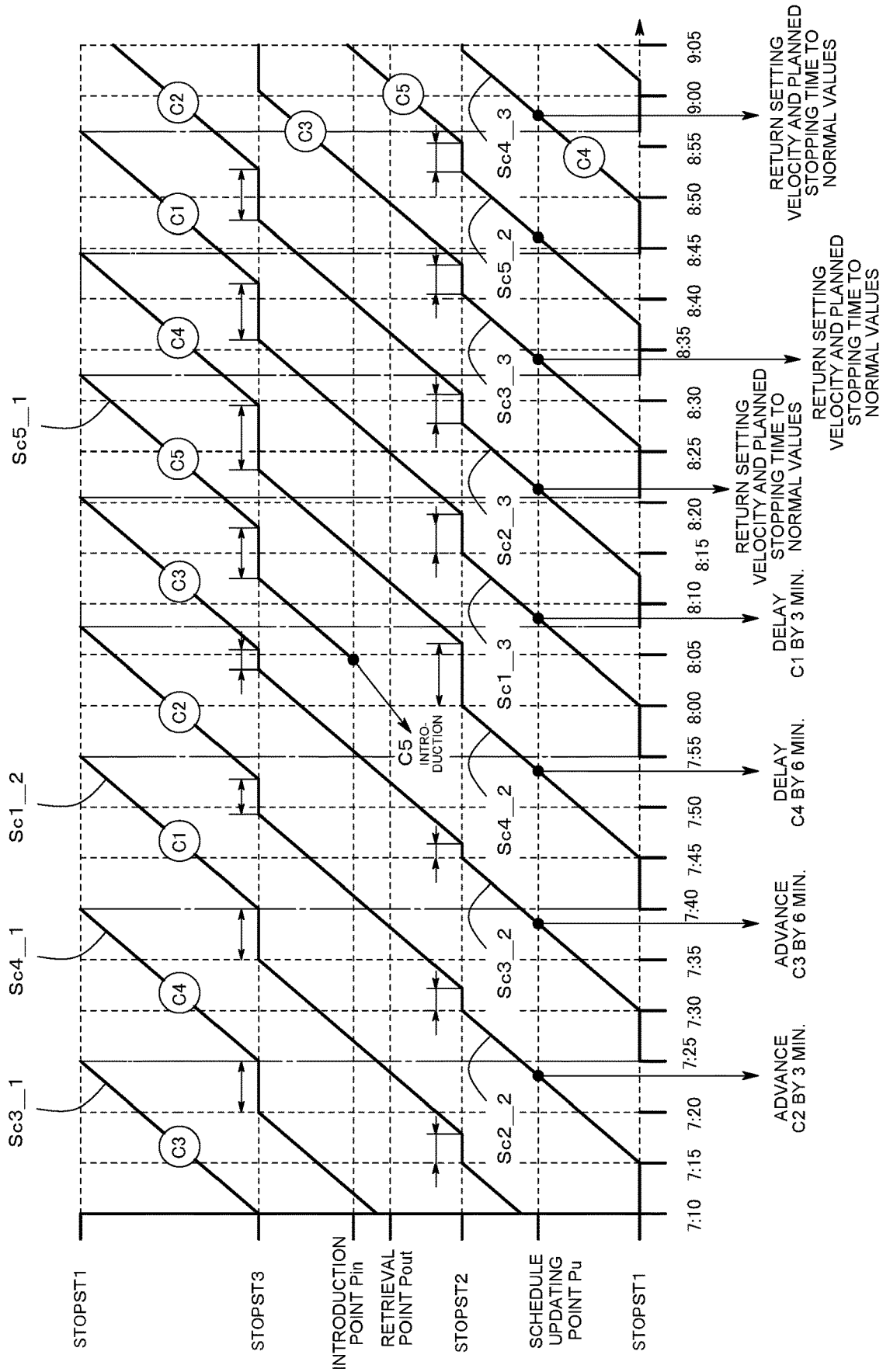
FIG. 16 shows a diagram showing an example of a cut-in change process, in which an introduction timing of an additional vehicle is set at a timing parallel to an operation schedule change.

When the circuit 100 is a dedicated road on which only the vehicles C travel, there is no external factor such as congestion by ordinary vehicles, and the additional vehicle C can be reliably introduced. Thus, alternatively, as exemplified in FIG. 16, the introduction timing of the additional vehicle C5 may be set at a timing parallel to the operation schedule change.

Schedule Change Process Flow

Figure 17:
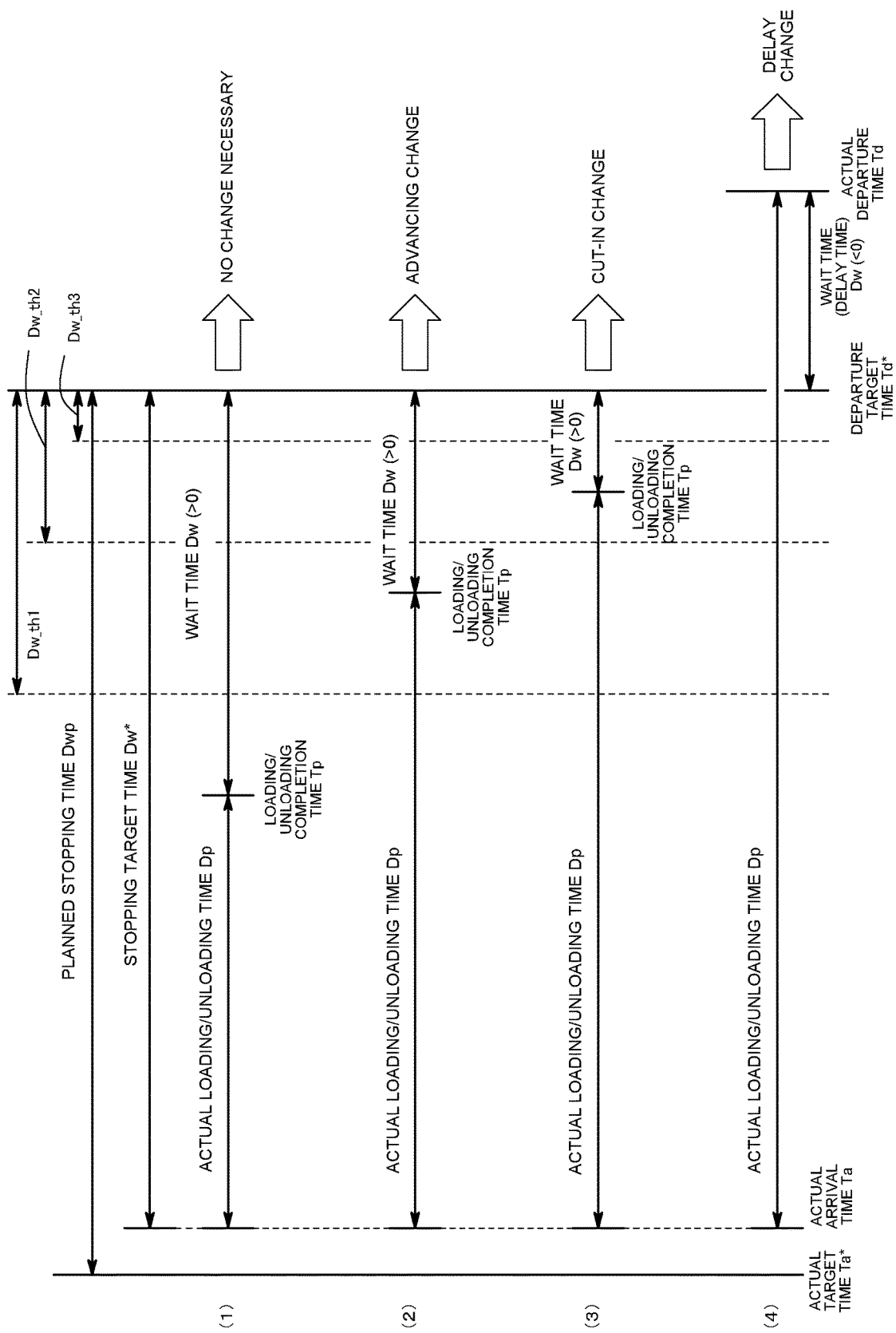
FIG. 17 is a diagram for explaining an overview of a schedule change process.

FIG. 17 exemplifies an overview of a schedule change process flow by the operation management apparatus 10. In this change process flow, as a parameter for judging the boarding demand (boarding demand parameter), the wait time Dw is used. As will be described in detail below, the introduction judgment unit 68 (FIG. 3) judges whether or not the additional vehicle is to be introduced based on the wait time Dw. In addition, when the introduction of the additional vehicle is decided, the operation schedule changer 61 (FIG. 3) executes one of the advancing change process, the delay change process, or the cut-in change process, based on the wait time Dw.

As the wait time Dw becomes larger (large in positive side), the time required for loading and unloading is shorter; that is, the number of passengers is smaller, meaning a lower boarding demand. In the contrary, when the wait time Dw reaches 0 or becomes negative, the time required for loading and unloading is long, and the number of passengers is large, meaning a higher boarding demand.

As a threshold for judging the highness/lowness of the boarding demand, a first threshold Dw_th1 is used. For example, the first threshold Dw_th1 is determined to be a value of about 40% of the planned stopping time Dwp. When the wait time Dw is greater than the first threshold Dw_th1, it is judged that the transport can be covered by the vehicles C currently in operation, without requiring addition of another vehicle (FIG. 17(1)).

When the wait time Dw is less than or equal to the first threshold Dw_th1, it is judged that introduction of an additional vehicle is necessary. In addition, for the change of the operation schedule due to the introduction of the additional vehicle, which of the advancing change process, the delay change process, and the cut-in change process is to be executed is determined based on a second threshold Dw_th2 and a third threshold Dw_th3.

The relationship of the magnitudes of the first threshold Dw_th1, the second threshold Dw_th2, and the third threshold Dw_th3 is Dw_th1>Dw_th2>Dw_th3. The second threshold Dw_th2 is determined, for example, at a value of about 30% of the planned stopping time Dwp. The third threshold Dw_th3 is determined, for example, at a value of about 15% of the planned stopping time Dwp.

As described above, the advancing change process does not involve delay of the departure target time Td*. Thus, reduction of satisfaction of the passengers can be suppressed. On the other hand, in the cut-in change process, delay occurs in the departure target time Td* in a part of the operating vehicles (delayed vehicle line group). For example, when the number of operating vehicles is n, delay is caused in n/2 operating vehicles. Further, in the delay change process, the departure target time Td* is delayed for all operating vehicles except for the reference vehicle. For example, when the number of operating vehicles is n, delay is caused in (n−1) operating vehicles. With occurrences of these delays, the satisfaction of the passengers may be reduced.

Therefore, in a range in which there is a sufficient wait time Dw, the advancing change process is executed (FIG. 17(2)), and when the margin in the wait time Dw is relatively reduced, the cut-in change process is executed (FIG. 17(3)). Further, when there is almost no margin in the wait time Dw or when the wait time Dw has a negative value indicating that there is a delay, the delay change process is executed (FIG. 17(4)).

Figure 18:
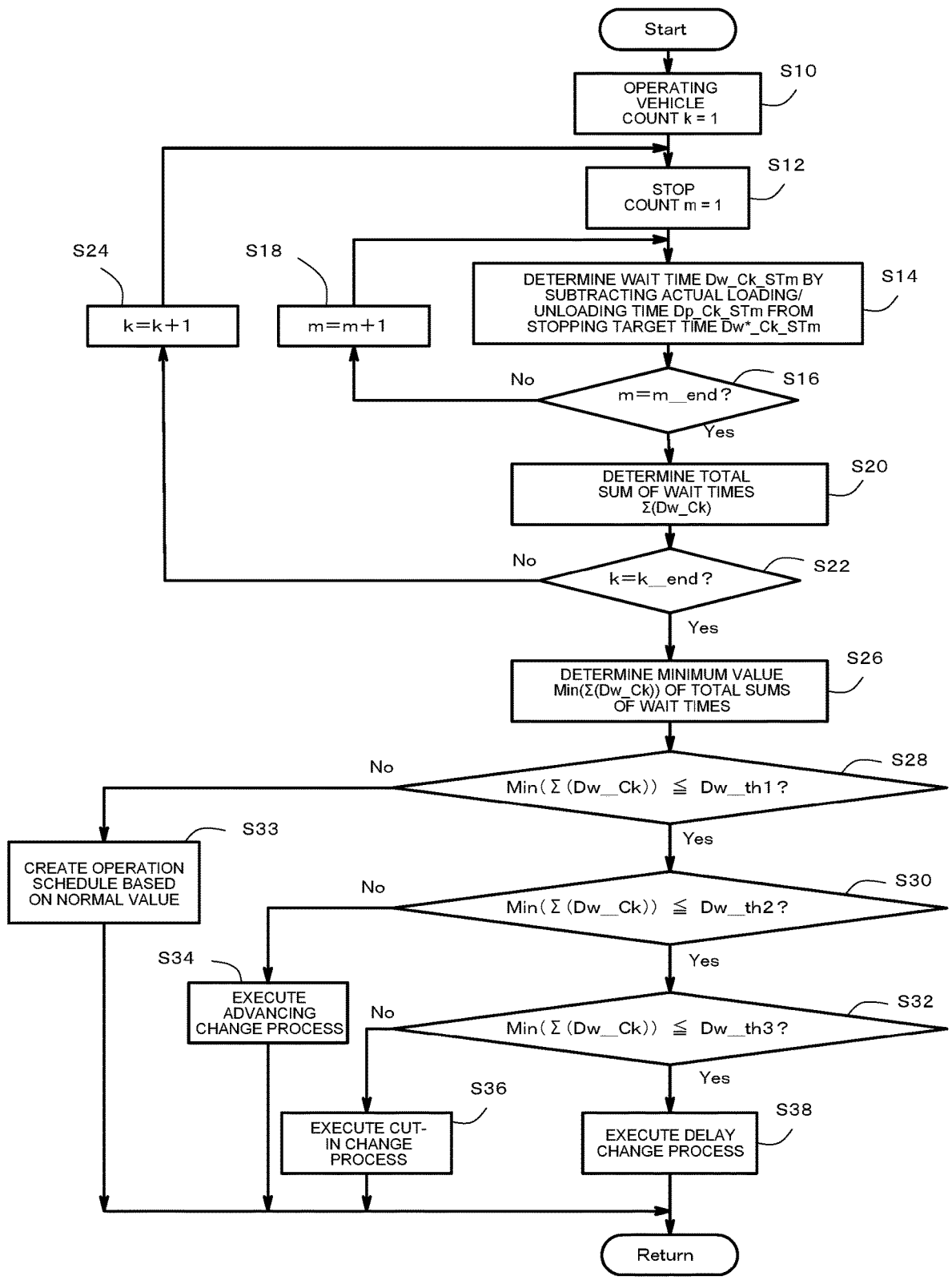
FIG. 18 is a flowchart exemplifying a schedule change process flow.

FIG. 18 exemplifies a schedule change process flow by the operation management apparatus 10. In this flow, in order to determine a wait time for one lap of the circuit 100, the first threshold Dw_th1, the second threshold Dw_th2, and the third threshold Dw_th3 are determined based on a total sum of the planned stopping times Dwp at the stops ST1 ST3.

For example, the total sum of the planned stopping times Dwp at the stops ST1 ST3 is determined for each of the operating vehicles C1~C4, and an average value of these total sums is set as a reference value. A value which is about 40%, for example, of the reference value is set as the first threshold Dw_th1, a value of about 30% of the reference value is set as the second threshold Dw_th2, and a value of about 15% of the reference value is set as the third threshold Dw_th3.

The boarding demand judgment unit 60 (FIG. 3) sets an operating vehicle count k to an initial value of 1 (S10). That is, a target for which the wait time is to be determined is set to the operating vehicle C1. Next, the boarding demand judgment unit 60 sets a stop count m to an initial value (S12). That is, the target for which the wait time is to be determined is set to the time when the operating vehicle C1 stops at the stop ST1.

The boarding demand judgment unit 60 acquires, from the operating vehicle C1, the actual arrival time Ta_C1_ST1 to the stop ST1, the loading/unloading completion time Tp_C1_ST1, and the departure target time Td*_C1_ST1 from the stop ST1. Further, the boarding demand judgment unit 60 determines the stopping target time Dw*_C1_ST1 from the actual arrival time Ta_C1_ST1 and the departure target time Td*_C1_ST1. In addition, the boarding demand judgment unit 60 determines the actual loading/unloading time Dp_C1_ST1 from the actual arrival time Ta_C1_ST1 and the loading/unloading completion time Tp_C1_ST1. Moreover, the boarding demand judgment unit 60 subtracts the actual loading/unloading time Dp_C1_ST1 from the stopping target time Dw*_C1_ST1, to determine the wait time Dw_C1_ST1 (S14).

The boarding demand judgment unit 60 then judges whether or not the stop count m has reaches a final value m_end (S16). When the final value has not been reached, the boarding demand judgment unit 60 increments the stop count m (S18), returns to step S14, and determines the wait time for the next stop.

When it is judged that the stop count m has reached the final value m_end, the boarding demand judgment unit 60 determines a total sum Σ(Dw_C1) of the wait times of one lap of the circuit 100, that is, wait times of all stops ST1~ST3, for the operating vehicle Ck (S20). Next, the boarding demand judgment unit 60 judges whether or not the operating vehicle count k has reached a final value k_end (S22). When the final value k_end has not been reached, the operating vehicle count k is incremented (S24), and the process returns to step S12.

When it is judged in step S22 that the operating vehicle count k has reached the final value k_end, the boarding demand judgment unit 60 determines a minimum value Min (Σ(Dw_Ck)) of the total sums Σ(Dw_Ck) of the wait times of the operating vehicles C1~C4 (S26). That is, a value having the smallest margin is selected as a representative value.

The introduction judgment unit 68 acquires the minimum value Min(Σ(Dw_Ck)) from the boarding demand judgement unit 60. The introduction judgement unit 68 judges whether or not the acquired value is less than or equal to the first threshold Dw_th1 (S28). When the minimum value Min(Σ(Dw_Ck)) is greater than the first threshold Dw_th1, it is judged that there is a sufficient wait time, and the boarding demand is low, and introduction of the additional vehicle is put off. The operation schedule creator 61 creates the operation schedule based on the normal value (S33), and transmits the operation schedule to each of the operating vehicles C1~C4.

On the other hand, when the minimum value Min(Σ(Dw_Ck)) is less than or equal to the first threshold Dw_th1, the introduction judgment unit 68 decides introduction of the additional vehicle C5. A notification of the decision is sent to the operation schedule changer 61.

For the introduction of the additional vehicle C5, the operation schedule changer 61 changes the operation schedule from the normal operation schedule. In executing such a change, the operation schedule changer 61 executes one of the advancing change process, the delay change process, or the cut-in change process based on the wait time which is the boarding demand parameter.

First, the operation schedule changer 61 judges whether or not the minimum value Min(Σ(Dw_Ck)) is less than or equal to the second threshold Dw_th2 (S30). When the minimum value Min(Σ(Dw_Ck)) is greater than the second threshold Dw_th2, that is, when the minimum value Min(Σ(Dw_Ck)) is in a range of less than or equal to the first threshold Dw_th1 and greater than the second threshold Dw_th2, the operation schedule changer 61 executes the advancing change process as the changing process of the operation schedule (S34).

On the other hand, when the minimum value Min(Σ(Dw_Ck)) is less than or equal to the second threshold Dw_th2, the operation schedule changer 61 further judges whether or not the minimum value Min(Σ(Dw_Ck)) is less than or equal to the third threshold Dw_th3 (S32). When the minimum value Min(Σ(Dw_Ck)) is greater than the third threshold Dw_th3, that is, when the minimum value Min(Σ(Dw_Ck)) is in a range of less than or equal to the second threshold Dw_th2 and greater than the third threshold Dw_th3, the operation schedule changer 61 executes the cut-in change process as the changing process of the operation schedule (S36).

On the other hand, when the minimum value Min(Σ (Dw_Ck)) is less than or equal to the third threshold Dw_th3, the operation schedule changer 61 executes the delay change process as the changing process of the operation schedule (S38).

The operation schedule is changed by one of the advancing change process, the delay change process, or the cut-in change process, and the inter-vehicle space for the additional vehicle C5 is secured. With this process, the operation schedule provider 63 provides to the additional vehicle C5 a normal operation schedule from the introduction point Pin to the operation schedule updating point Pu. As a result, the operations by the operating vehicles C1~C5 are performed.

Alternative Configuration of Operation Schedule Change

In the above-described embodiment, the schedule change from the normal operation schedule is applied for one lap of the circuit 100, but the present disclosure is not limited to such a configuration. For example, the changed schedule may be applied for a plurality of laps. For example, when the advancement magnitude for a predetermined operating vehicle is 9 minutes, the advancement process may be executed over 3 laps, 3 minutes per lap.

The present disclosure is not limited to the present embodiments described above, and includes all changes and modifications without departing from the technical scope or the essence of the present disclosure defined by the claims.

The invention claimed is:

1. An operation management apparatus of autonomous travel vehicles, which manages operations of a plurality of vehicles which autonomously travel on a circuit, the operation management apparatus comprising:
   an operation schedule provider that provides a normal operation schedule, in which an arrival target time and a departure target time to and from each of a plurality of stops provided on the circuit are determined, to each of a plurality of operating vehicles which are autonomously traveling on the circuit;
   an introduction judgment unit that judges whether or not an additional vehicle is to be introduced to the circuit based on a boarding demand on the circuit; and
   a schedule changer that changes an operation schedule to be provided to each of the plurality of operating vehicles from the normal operation schedule when the introduction judgment unit decides introduction of the additional vehicle, wherein
   the schedule changer can execute, as a schedule change process for changing the normal operation schedule:
   an advancing change process in which a predetermined reference vehicle among the plurality of operating vehicles is set as a leading vehicle, and the departure target time of each of the operating vehicles which follow the reference vehicle is advanced from the departure target time determined based on the normal operation schedule so that an inter-vehicle space between a last operating vehicle among the operating vehicles following the reference vehicle and the reference vehicle on a next lap is enlarged for the additional vehicle;
   a delay change process in which the departure target time of each of the operating vehicles which follow the reference vehicle is delayed from the departure target time determined based on the normal operation schedule so that an inter-vehicle space between the reference vehicle and an operating vehicle following the reference vehicle as a next vehicle is enlarged for the additional vehicle; and
   a cut-in change process in which the plurality of operating vehicles are divided into an advanced vehicle line group for which the departure target time is advanced from the departure target time determined based on the normal operation schedule, and a delayed vehicle line group for which the departure target time is delayed from the departure target time determined based on the normal operation schedule, and an inter-vehicle space between the advanced vehicle line group and the delayed vehicle line group is enlarged for the additional vehicle, and
   the schedule changer executes one of the advancing change process, the delay change process, or the cut-in change process based on the boarding demand.

2. The operation management apparatus of autonomous travel vehicles according to claim 1, wherein
   the schedule changer executes one of the advancing change process, the delay change process, or the cut-in change process before introduction of the additional vehicle to the circuit.

3. The operation management apparatus of autonomous travel vehicles according to claim 1, further comprising:
   a boarding demand judgment unit that determines, for each of the operating vehicles and as a boarding demand parameter, a wait time in which an actual loading/unloading time from an actual arrival time to completion of loading/unloading to and from the operating vehicle is subtracted from a stopping target time from the actual arrival time to the departure target time for the operating vehicle at each of the stops, wherein
   the schedule changer executes one of the advancing change process, the delay change process, or the cut-in change process based on the wait time.

4. The operation management apparatus of autonomous travel vehicles according to claim 3, wherein
   the schedule changer:
   determines a total sum of the wait times for one lap of the circuit for each of the operating vehicles;
   executes the advancing change process when a minimum value of the total sums of the wait times determined for the operating vehicles is less than or equal to a first threshold and greater than a second threshold which is smaller than the first threshold;
   executes the cut-in change process when the minimum value of the total sums of the wait times is less than or equal to the second threshold and greater than a third threshold which is smaller than the second threshold; and
   executes the delay change process when the minimum value of the total sums of the wait times is less than or equal to the third threshold.

5. The operation management apparatus of autonomous travel vehicles according to claim 3, wherein
   in executing the advancing change process, the schedule changer determines an advancement magnitude of the departure target time for each of the stops according to the wait time at the stop.

6. The operation management apparatus of autonomous travel vehicles according to claim 3, wherein
   in executing the delay change process, the schedule changer determines a push-back magnitude of the departure target time for each of the stops according to the wait time at the stop.

7. An operation management method of autonomous travel vehicles, for managing operations of a plurality of vehicles which autonomously travel on a circuit, the method comprising:

providing a normal operation schedule, in which an arrival target time and a departure target time to and from each of a plurality of stops provided on the circuit are determined, to each of a plurality of operating vehicles which are autonomously traveling on the circuit;

judging whether or not an additional vehicle is to be introduced to the circuit based on a boarding demand on the circuit; and changing an operation schedule to be provided to each of the plurality of operating vehicles from the normal operation schedule when introduction of the additional vehicle is decided, wherein as a schedule change process for changing the normal operation schedule, there can be executed:

an advancing change process in which a predetermined reference vehicle among the plurality of operating vehicles is set as a leading vehicle, and the departure target time of each of the operating vehicles which follow the reference vehicle is advanced from the departure target time determined based on the normal operation schedule so that an inter-vehicle space between a last operating vehicle among the operating vehicles following the reference vehicle and the reference vehicle on a next lap is enlarged for the additional vehicle;

a delay change process in which the departure target time of each of the operating vehicles which follow the reference vehicle is delayed from the departure target time determined based on the normal operation schedule so that an inter-vehicle space between the reference vehicle and an operating vehicle following the reference vehicle as a next vehicle is enlarged for the additional vehicle; and a cut-in change process in which the plurality of operating vehicles are divided into an advanced vehicle line group for which the departure target time is advanced from the departure target time determined based on the normal operation schedule, and a delayed vehicle line group for which the departure target time is delayed from the departure target time determined based on the normal operation schedule, and an inter-vehicle space between the advanced vehicle line group and the delayed vehicle line group is enlarged for the additional vehicle, and one of the advancing change process, the delay change process, or the cut-in change process is executed based on the boarding demand.

8. The operation management method of autonomous travel vehicles according to claim 7, wherein
one of the advancing change process, the delay change process, or the cut-in change process is executed before introduction of the additional vehicle to the circuit.

9. The operation management method of autonomous travel vehicles according to claim 7, further comprising:
determining, for each of the operating vehicles and as a boarding demand parameter, a wait time in which an actual loading/unloading time from an actual arrival time to completion of loading/unloading to and from the operating vehicle is subtracted from a stopping target time from the actual arrival time to the departure target time for the operating vehicle at each of the stops, wherein
one of the advancing change process, the delay change process, or the cut-in change process is executed based on the wait time.

10. The operation management method of autonomous travel vehicles according to claim 9, further comprising:
determining a total sum of the wait times for one lap of the circuit for each of the operating vehicles, wherein
the advancing change process is executed when a minimum value of the total sums of the wait times determined for the operating vehicles is less than or equal to a first threshold and greater than a second threshold which is smaller than the first threshold,
the cut-in change process is executed when the minimum value of the total sums of the wait times is less than or equal to the second threshold and greater than a third threshold which is smaller than the second threshold, and
the delay change process is executed when the minimum value of the total sums of the wait times is less than or equal to the third threshold.

11. The operation management method of autonomous travel vehicles according to claim 9, wherein
in executing the advancing change process, an advancement magnitude of the departure target time is determined for each of the stops according to the wait time at the stop.

12. The operation management method of autonomous travel vehicles according to claim 9, wherein
in executing the delay change process, a push-back magnitude of the departure target time is determined for each of the stops according to the wait time at the stop.

* * * * *